United States Patent
Nemoto et al.

(10) Patent No.: US 9,041,692 B2
(45) Date of Patent: May 26, 2015

(54) DISPLAY DEVICE

(75) Inventors: Tadashi Nemoto, Osaka (JP); Naru Usukura, Osaka (JP); Akizumi Fujioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 222 days.

(21) Appl. No.: 13/811,993

(22) PCT Filed: Jul. 22, 2011

(86) PCT No.: PCT/JP2011/066747
§ 371 (c)(1),
(2), (4) Date: Jan. 24, 2013

(87) PCT Pub. No.: WO2012/014819
PCT Pub. Date: Feb. 2, 2012

(65) Prior Publication Data
US 2013/0120321 A1    May 16, 2013

(30) Foreign Application Priority Data
Jul. 26, 2010   (JP) .................................. 2010-167381

(51) Int. Cl.
*G09G 3/34*    (2006.01)
*G06F 3/041*   (2006.01)
(Continued)

(52) U.S. Cl.
CPC ............ *G09G 3/3406* (2013.01); *G06F 3/0412* (2013.01); *G06F 3/042* (2013.01); *G09G 3/3648* (2013.01); *G09G 2330/025* (2013.01); *G09G 2360/142* (2013.01)

(58) Field of Classification Search
CPC ... G06F 3/0412; G06F 3/042; G02F 1/13338; G02F 2001/13312
See application file for complete search history.

(56) References Cited

U.S. PATENT DOCUMENTS

| | | |
|---|---|---|
| 2005/0219229 A1 | 10/2005 | Yamaguchi |
| 2009/0225058 A1 | 9/2009 | Tateuchi et al. |
| 2011/0241984 A1* | 10/2011 | Morrison et al. ............. 345/157 |

(Continued)

FOREIGN PATENT DOCUMENTS

| | | |
|---|---|---|
| EP | 2 221 659 A1 | 8/2010 |
| JP | 2005-275644 A | 10/2005 |

(Continued)

OTHER PUBLICATIONS

Official Communication issued in International Patent Application No. PCT/JP2011/066747, mailed on Sep. 6, 2011.

*Primary Examiner* — Amare Mengistu
*Assistant Examiner* — Shawna Stepp Jones
(74) *Attorney, Agent, or Firm* — Keating & Bennett, LLP

(57) ABSTRACT

A photosensor-equipped display device is provided having a combination of visible and non-visible light sources where a voltage drop is minimized when the non-visible light source is turned on. The display device includes: an active matrix substrate; photosensors (9) provided in a pixel region (4) of the active matrix substrate; white LEDs (3a) configured to cause an image to be displayed in the pixel region (4); infrared LEDs (3b) configured to emit light to be reflected and sensed by the photosensors; and a light source control circuit (13) configured to control on and off of the white LEDs (3a) and the infrared LEDs (3b). The light source control circuit (13) reduces an amount of drive current supplied to the white LEDs (3a) while the infrared LEDs (3b) are on to below an amount of drive current supplied to the white LEDs (3a) when the infrared LEDs (3b) are off.

12 Claims, 27 Drawing Sheets

(51) Int. Cl.
*G06F 3/042* (2006.01)
*G09G 3/36* (2006.01)

(56) References Cited

U.S. PATENT DOCUMENTS

2012/0268701 A1* 10/2012 Nemoto et al. ............... 349/106

2013/0010496 A1* 1/2013 Higashi et al. ............... 362/609

FOREIGN PATENT DOCUMENTS

| JP | 2005-301373 A | 10/2005 |
| JP | 2009-217461 A | 9/2009 |
| JP | 2011-86220 A | 4/2011 |
| WO | 2009/081810 A1 | 7/2009 |

* cited by examiner

DISPLAY DEVICE

TECHNICAL FIELD

The present invention relates to photosensor-equipped display devices including light detecting elements such as photodiodes, and more particularly, to display devices including a light source for light to be detected different from a display light source.

BACKGROUND ART

Photosensor-equipped display devices have been proposed that include light detecting elements, such as photodiodes, in the pixels so as to be capable of sensing the brightness of ambient light or capturing an image of an object located close to the display. Typically, such photosensor-equipped display devices may be used as two-way communication display devices or devices with touch panel capabilities.

Such a photosensor-equipped display device is disclosed, for example, in JP 2005-275644 A, where a backlight including a combination of two different sets of light sources, each set capable of emitting visible or non-visible light, turns these sets of light sources on at different times to make it possible to detect the location of an object independently from image display.

As discussed above, in a display device with a backlight including a combination of visible and non-visible light sources, the non-visible light source is driven in a synchronized manner with the sensing of light by the photosensors. A problem with this arrangement is that turning on the non-visible light source may cause a momentary voltage drop at the backlight.

DISCLOSURE OF THE INVENTION

In view of this problem, an object of the present invention is to minimize a voltage drop in a photosensor-equipped display device having a combination of visible and non-visible light sources when the non-visible light source is turned on.

A display device disclosed herein includes: an active matrix substrate; photosensors provided in a pixel region of the active matrix substrate; a visible light source configured to cause an image to be displayed in the pixel region; a non-visible light source configured to emit light to be reflected and sensed by the photosensors; and a light source control circuit configured to control on and off of the visible light source and the non-visible light source, wherein the light source control circuit reduces an amount of drive current supplied to the visible light source while the non-visible light source is on to below an amount of drive current supplied to the visible light source when the non-visible light source is off.

The above arrangement will provide a photosensor-equipped display device including both visible and non-visible light sources with reduced voltage drop occurring when the non-visible light source is turned on.

EMBODIMENTS FOR CARRYING OUT THE INVENTION

Figure 1:
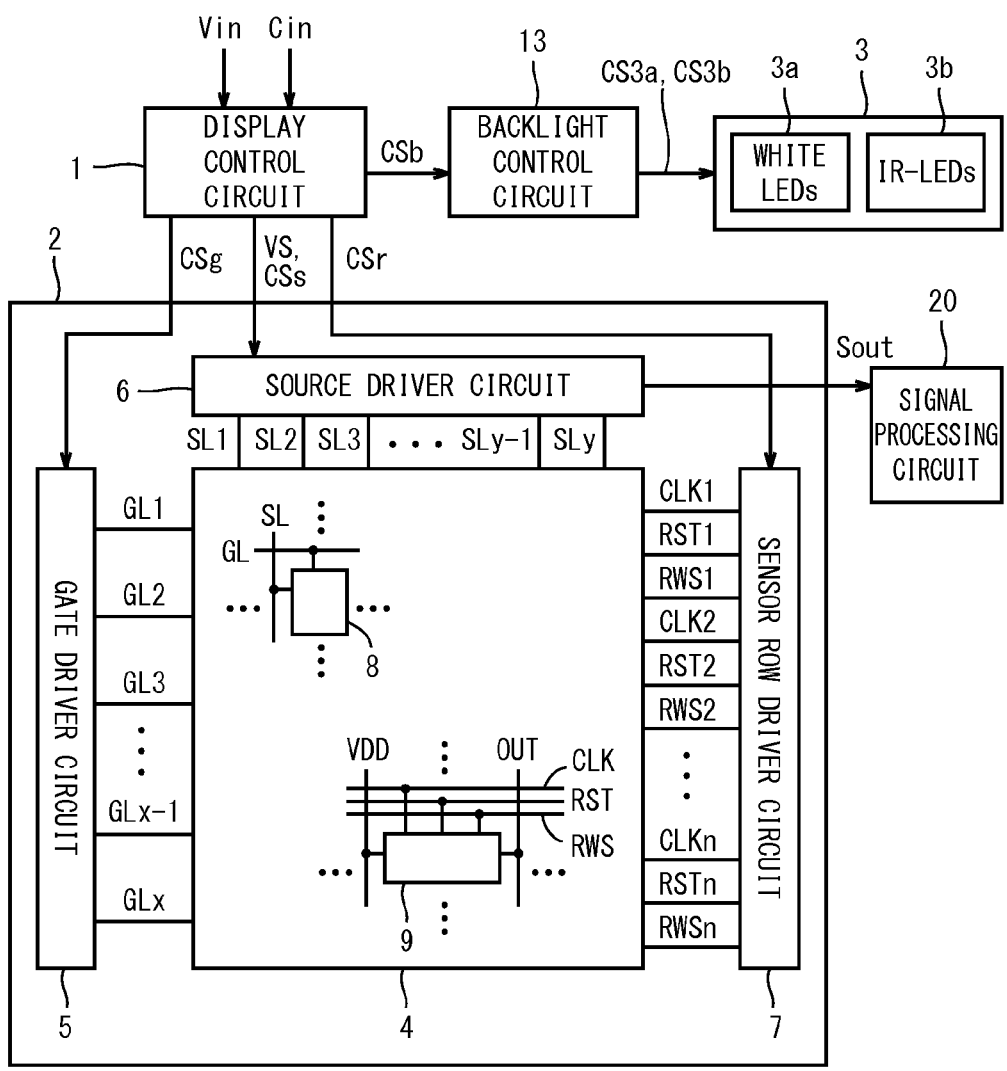
FIG. 1 is a block diagram of a display device according to an embodiment of the present invention.

A display device according to an embodiment of the present invention includes:

an active matrix substrate;

photosensors provided in a pixel region of the active matrix substrate;

a visible light source configured to cause an image to be displayed in the pixel region;

a non-visible light source configured to emit light to be reflected and sensed by the photosensors; and a light source control circuit configured to control on and off of the visible light source and the non-visible light source, wherein the light source control circuit reduces an amount of drive current supplied to the visible light source while the non-visible light source is on to below an amount of drive current supplied to the visible light source when the non-visible light source is off (first arrangement).

In the first arrangement above, a sum of an amount of power for the non-visible light source and an amount of power for the visible light source supplied when the non-visible light source is on may be equal to a sum of an amount of power for the non-visible light source and an amount of power for the visible light source supplied when the non-visible light source is off (second arrangement).

In the first arrangement above, a period during which the amount of drive current supplied to the visible light source is reduced may be longer than a period during which the non-visible light source is on (third arrangement).

In the first arrangement above, the light source control circuit may initiate the period during which the amount of drive current supplied to the visible light source is reduced before the non-visible light source is turned on (fourth arrangement).

In one of the first to fourth arrangements above, the light source control circuit may include:

a power supply control circuit connected to a first terminal of the visible light source and a first terminal of the non-visible light source for supplying a constant voltage to the visible light source and the non-visible light source;

a first switching element connected between a second terminal of the visible light source and a resistor; and a second switching element connected between a second terminal of the non-visible light source and a resistor (fifth arrangement).

In one of the first to fifth arrangements above, the visible light source may be a white LED (sixth arrangement).

In the first to sixth arrangements above, the non-visible light source may be a infrared LED (seventh arrangement).

One of the first to seventh arrangements above may further include:

a sensor drive circuit configured to supply a sensor drive signal to the photosensors;

an amplifier circuit configured to amplify a signal read from the photosensors in response to the sensor drive signal to output a photosensor signal; and a signal processing circuit configured to process the photosensor signal output from the amplifier circuit, each of the photosensors including:

a first sensor pixel circuit configured to, in response to the sensor drive signal, accumulate a charge corresponding to an amount of light received during an accumulation period in which the non-visible light source is on, and output, during a readout period, a sensor signal corresponding to the charge that has been accumulated; and a second sensor pixel circuit configured to, in response to the sensor drive signal, accumulate a charge corresponding to an amount of light received during an accumulation period in which the non-visible light source is off, and output, during a readout period, a sensor signal corresponding to the charge that has been accumulated, wherein the signal processing circuit may calculate a difference between the sensor signal output from the first sensor pixel circuit and the sensor signal output from the second sensor pixel circuit (eighth arrangement).

In one of the first to eighth arrangements above, each of the first and second sensor pixel circuits may include:

one light receiving element;

one accumulation node capable of accumulating a charge corresponding to an amount of light sensed;

a readout transistor having a control terminal electrically connectable with the accumulation node; and a retaining switching element provided on a path of current passing through the light receiving element, the retaining switching element being configured to be turned on or off in response to the control signal (ninth arrangement).

In the ninth arrangement above, in each of the first and second sensor pixel circuits, the retaining switching element may be provided between the accumulation node and one terminal of the light receiving element, and another terminal of the light receiving element may be connected with a reset line (tenth arrangement).

In one of the first to eight arrangements above, the first and second sensor pixel circuits may share one light receiving element, and one terminal of the light receiving element may be connected with one end of a retaining switching element included in each of the first and second sensor pixel circuits and another terminal may be connected with the reset line (eleventh arrangement).

One of the first to eleventh arrangements above may further include:

a counter substrate being opposite the active matrix substrate; and liquid crystal sandwiched between the active matrix substrate and the counter substrate (twelfth arrangement).

[Embodiments]

More specific embodiments of the present invention will now be described with reference to the drawings. While the embodiments below illustrate implementations where the display device of the present invention is a liquid crystal display device, the present invention is not limited to liquid crystal display devices and may be used in any display device using an active matrix substrate. Typically, the display device of the present invention may be a touch panel-equipped display device having photosensors to detect an object located close to the screen for an input operation, or a two-way communication display device including display and image capturing capabilities.

For ease of explanation, the drawings referred to below schematically show only those of the components of the embodiments of the present invention that are necessary to illustrate the present invention. Accordingly, the display device of the present invention may include an optional component not shown in the drawings referred to herein. Further, the dimensions of the parts in the drawings do not exactly represent the dimensions of the actual components, the dimension ratios of the components or the like.

[First Embodiment]

FIG. 1 is a block diagram of a display device according to an embodiment of the present invention. The display device shown in FIG. 1 includes a display control circuit 1, display panel 2, backlight 3 and backlight control circuit 13 (light source control circuit). The display panel 2 includes a pixel region 4, gate driver circuit 5, source driver circuit 6 (amplifier circuit) and sensor row driver circuit 7 (sensor drive circuit). The pixel region 4 includes a plurality of display pixel circuits 8 and a plurality of sensor pixel circuits 9 (photosensors). The display device has the capability of displaying an image on the display panel 2 and the capability of sensing light entering the display panel 2. In the following description, x is an integer not smaller than 2, y is a multiple of 3, m and n are even numbers, and the frame rate of the display device is 60 frames per second.

The display device shown in FIG. 1 is supplied with a video signal Vin and a timing control signal Cin from the outside. Based on these signals, the display control circuit 1 outputs a video signal VS and control signals CSg, CSs and CSr to the display panel 2, and outputs a control signal CSb to the backlight control circuit 13. The video signal VS may be the same as the video signal Vin, or may be created by performing signal processing on the video signal Vin.

The backlight 3 is provided on the back side of the display panel 2 and illuminates the back side of the display panel 2. The backlight 3 includes a set of white LEDs 3a, which serve as visible light sources, and a set of infrared LEDs (denoted as IR-LEDs in FIG. 1) 3b, which serve as non-visible light sources. The visible light sources (white LEDs 3a in this implementation) are light sources used to display an image in the pixel region 4. The non-visible light sources (infrared LEDs 3b in this implementation) emit light in a wavelength other than those of visible light. A touch location may be detected as light emitted from the non-visible light sources is reflected from a finger, touch pen or the like in contact with the surface of the display panel 2 and enters one or more sensor pixel circuits 9.

While the visible light sources are white LEDs 3a and the non-visible light sources are infrared LEDs 3b in this implementation, other light sources may be used. For example, these light sources may not be LEDs. It should be noted that light emitted from the visible light sources may contain light in a wavelength other than those of visible light. Although it is preferable that light emitted from the non-visible light sources does not contain a component in a visible light wavelength, it is not necessary that no component in a visible light wavelength is contained at all.

The backlight control circuit 13 supplies the white LEDs 3a with a drive current CS3a that controls on and off of these LEDs. The backlight control circuit 13 supplies the infrared LEDs 3b with a drive current CS3b that controls on and off of these LEDs. The on/off timing of the white LEDs 3a and infrared LEDs 3b will be described further below.

(x×y) display pixel circuits 8 and (n×m/2) sensor pixel circuit 9 are arranged in a two-dimensional array in the pixel region 4 of the display panel 2. More specifically, x gate lines GL1 to GLx and y source lines SL1 to SLy are provided in the pixel region 4. The gate lines GL1 to GLx are parallel to each other, and the source lines SL1 to SLy are perpendicular to the gate lines GL1 to GLx and parallel to each other. The (x×y) display pixel circuits 8 are each located in the vicinity of the intersection of one of the gate lines GL1 to GLx and one of the source lines SL1 to SLy. The display pixel circuits 8 are each connected with one gate line GL and one source line SL. The display pixel circuits 8 are categorized into those for red display, green display and blue display. Three display pixel circuits 8, each being one of these three types, are arranged in a direction in which the gate lines GL1 to GLx extend, and constitute one color pixel.

N clock lines CLK1 to CLKn, n reset lines RST1 to RSTn and n readout lines RWS1 to RWSn are provided in the pixel region 4, parallel to the gate lines GL1 to GLx. Other signal lines or power supply lines (not shown) may be provided in the pixel region 4, parallel to the gate lines GL1 to GLx. When the sensor pixel circuits 9 are read, m lines selected from the source lines SL1 to SLy are used as power supply lines VDD1 to VDDm and other m lines are used as output lines OUT1 to OUTm.

Figure 2:
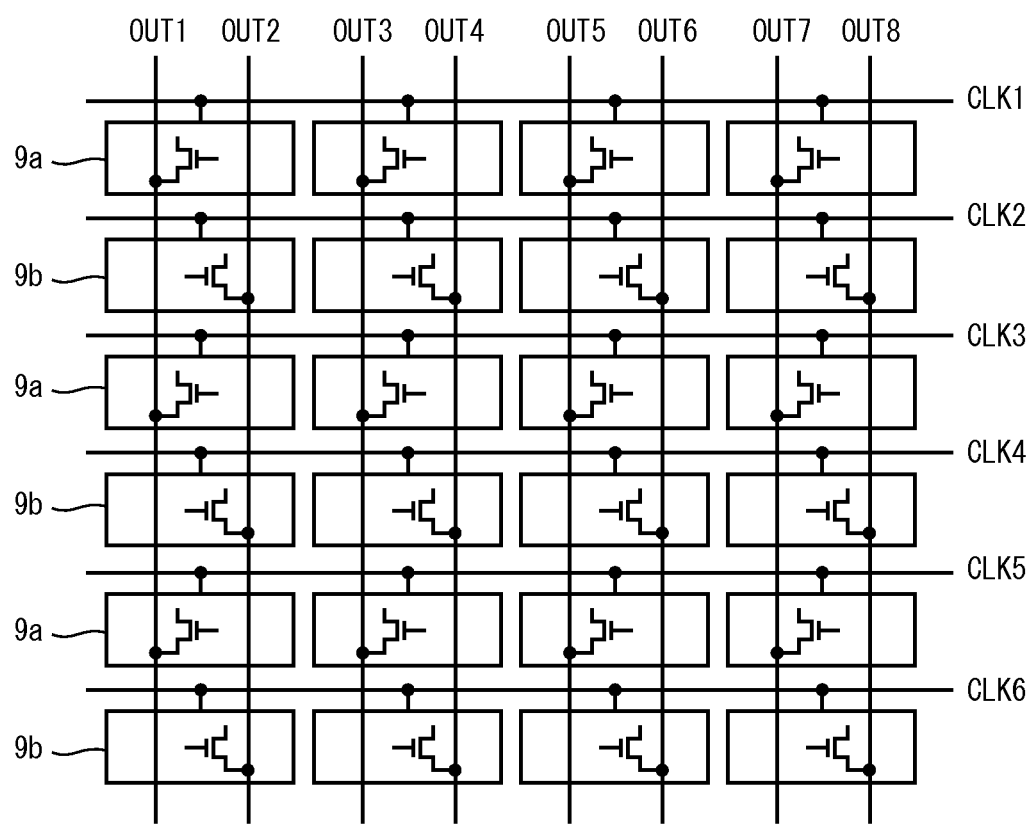
FIG. 2 illustrates an arrangement of sensor pixel circuits in a display panel included in the display device of FIG. 1.

FIG. 2 illustrates an arrangement of sensor pixel circuits 9 in the pixel region 4. The (n×m/2) sensor pixel circuits 9 include first sensor pixel circuits 9a that detect light entering them while the infrared LEDs 3b are on and second sensor pixel circuits 9b that detect light entering them while the infrared LEDs 3b are off. The same number of first sensor pixel circuits 9a and second sensor pixel circuits 9b are provided. In FIG. 2, the (n×m/4) first sensor pixel circuits 9a are each located in the vicinity of the intersection of an odd-numbered one of the clock lines CLK1 to CLKn−1 and an odd-numbered one of the output lines OUT1 to OUTm−1. The (n×m/4) second sensor pixel circuits 9b are each located in the vicinity of the intersection of an even-numbered one of the clock lines CLK2 to CLKn and an even-numbered one of the output lines OUT2 to OUTm. Thus, the display panel 2 includes a plurality of output lines OUT1 to OUTm that convey output signals from the first sensor pixel circuits 9a and output signals from the second sensor pixel circuits 9b, where the first sensor pixel circuits 9a and second sensor pixel circuits 9b are connected with different output lines depending on such classification.

The gate driver 5 drives the gate lines GL1 to GLx. More specifically, in response to a control signal CSg, the gate driver circuit 5 sequentially selects one of the gate lines GL1 to GLx and applies a high-level potential to the selected gate line, and applies a low-level potential to the other gate lines. Thus, the y display pixel circuits 8 connected with the selected gate line are selected at a time.

The source driver circuit 6 drives the source lines SL1 to SLy. More specifically, in response to a control signal CSs, the source driver circuit 6 applies a potential corresponding to a video signal VS to the source lines SL1 to SLy. The source driver circuit 6 may perform line-sequential driving or point-sequential driving. The potential applied to the source lines SL1 to SLy is written to the one of the y display pixel circuits 8 that has been selected by the gate driver circuit 5. Thus, the gate driver circuit 5 and source driver circuit 6 are used to write a potential corresponding to a video signal VS into each of the display pixel circuits 8 to display a desired image on the display panel 2.

The sensor row driver circuit 7 drives the clock lines CLK1 to CLKn, reset lines RST1 to RSTn, readout lines RWS1 to RWSn and the like. More specifically, in response to a control signal CSr, the sensor row driver circuit 7 applies a high-level potential and a low-level potential to the clock lines CLK1 to CLKn in accordance with the timing shown in FIG. 4 (described in detail below). In response to a control signal CSr, the sensor row driver circuit 7 selects (n/2) or two of the reset lines RST1 to RSTn and applies a high-level potential for reset to the selected reset lines and applies a low-level line to the other reset lines. Thus, the (n×m/4) or m sensor pixel circuits 9 connected with the reset lines to which a high-level potential is applied are reset at a time.

In response to a control signal CSr, the sensor row driver circuit 7 sequentially selects two adjacent ones of the readout lines RWS1 to RWSn and applies a high-level potential for readout to the selected readout lines and applies a low-level potential to the other readout lines. Thus, the m sensor pixel circuits 9 connected with the selected two readout lines are readable at a time. At this moment, the source driver circuit 6 applies a high-level potential to the power supply lines VDD1 to VDDm. Thus, signals each corresponding to an amount of light detected by a sensor pixel circuit 9 (hereinafter referred to as "sensor signals") are output from the m readable sensor pixel circuits 9 to the output lines OUT1 to OUTm.

The source driver circuit 6 includes a difference circuit (not shown) that calculates the differences between output signals from the first sensor pixel circuits 9a and output signals from the second sensor pixel circuits 9b. The source driver circuit 6 amplifies the differences in the amount of light calculated by the difference circuit and outputs the amplified signals, i.e. a sensor output Sout, to the outside of the display panel 2. The sensor output Sout is processed as necessary by a signal processing circuit 20, provided outside the display panel 2. Thus, the source driver circuit 6 and sensor row driver circuit 7 are used to read sensor signals from all the sensor pixel circuits 9, thereby allowing light entering the display panel 2 to be detected.

Figure 3:
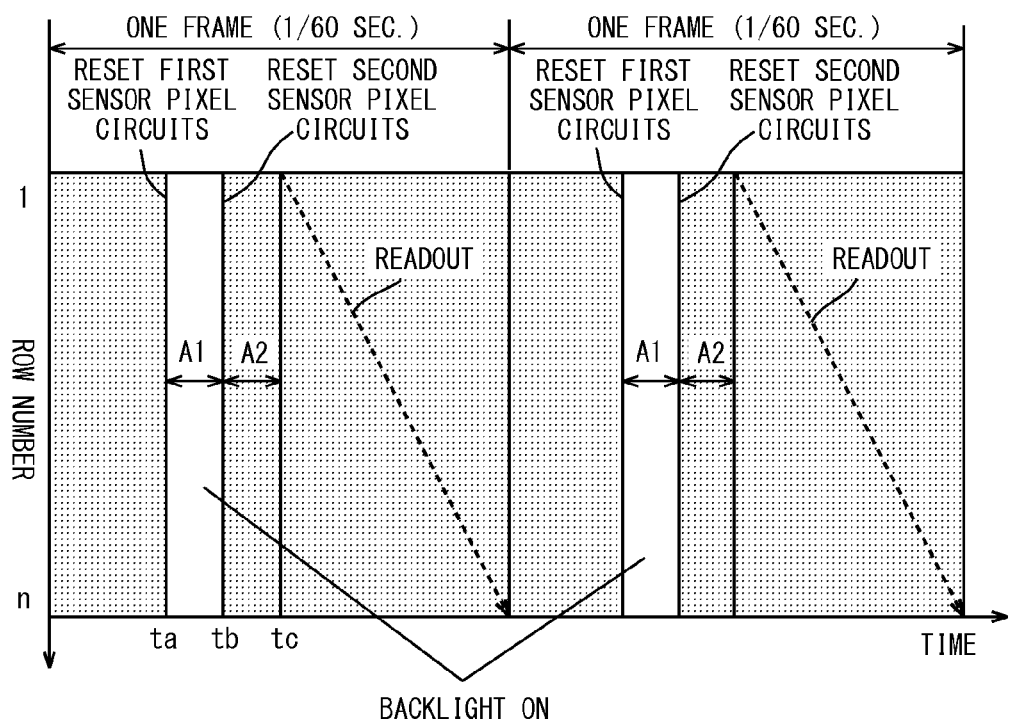
FIG. 3 illustrates the timing of on and off of the backlight where the display device of FIG. 1 is driven once in a frame, as well as the timing of resetting and readout of the sensor pixel circuits.

FIG. 3 illustrates the timing of on and off of the infrared LEDs 3b, as well as the timing of resetting and readout of the sensor pixel circuits 9. In the example of FIG. 3, the infrared LEDs 3b are turned on once in one frame and are kept on for a predetermined period of time, and are otherwise off. Specifically, within one frame, the infrared LEDs 3b are turned on at time ta and turned off at time tb. In addition, all the first sensor pixel circuits 9a are reset at time ta, and all the second sensor pixel circuits 9b are reset at time tb.

The first sensor pixel circuits 9a detect light entering them in a period A1, from time ta to time tb (i.e. The period in which the infrared LEDs 3b are on). The second sensor pixel circuits 9b detect light entering them in a period A2, from time tb to time tc (i.e. the period in which the infrared LEDs 3b are off). The periods A1 and A2 are equally long. Readout operations of the first sensor pixel circuits 9a and the second sensor pixel circuits 9b occur in parallel and in a line-sequential manner from time tc onward. In FIG. 3, the readout of the sensor pixel circuits 9 is completed within one frame; however, it is sufficient if the readout is completed by the time the first sensor pixel circuit 9a are reset in the next frame.

Although FIG. 3 shows an example where the sensor pixel circuits 9 are read once in one frame, the sensor pixel circuits 9 may be read twice or more in one frame.

Figure 4:
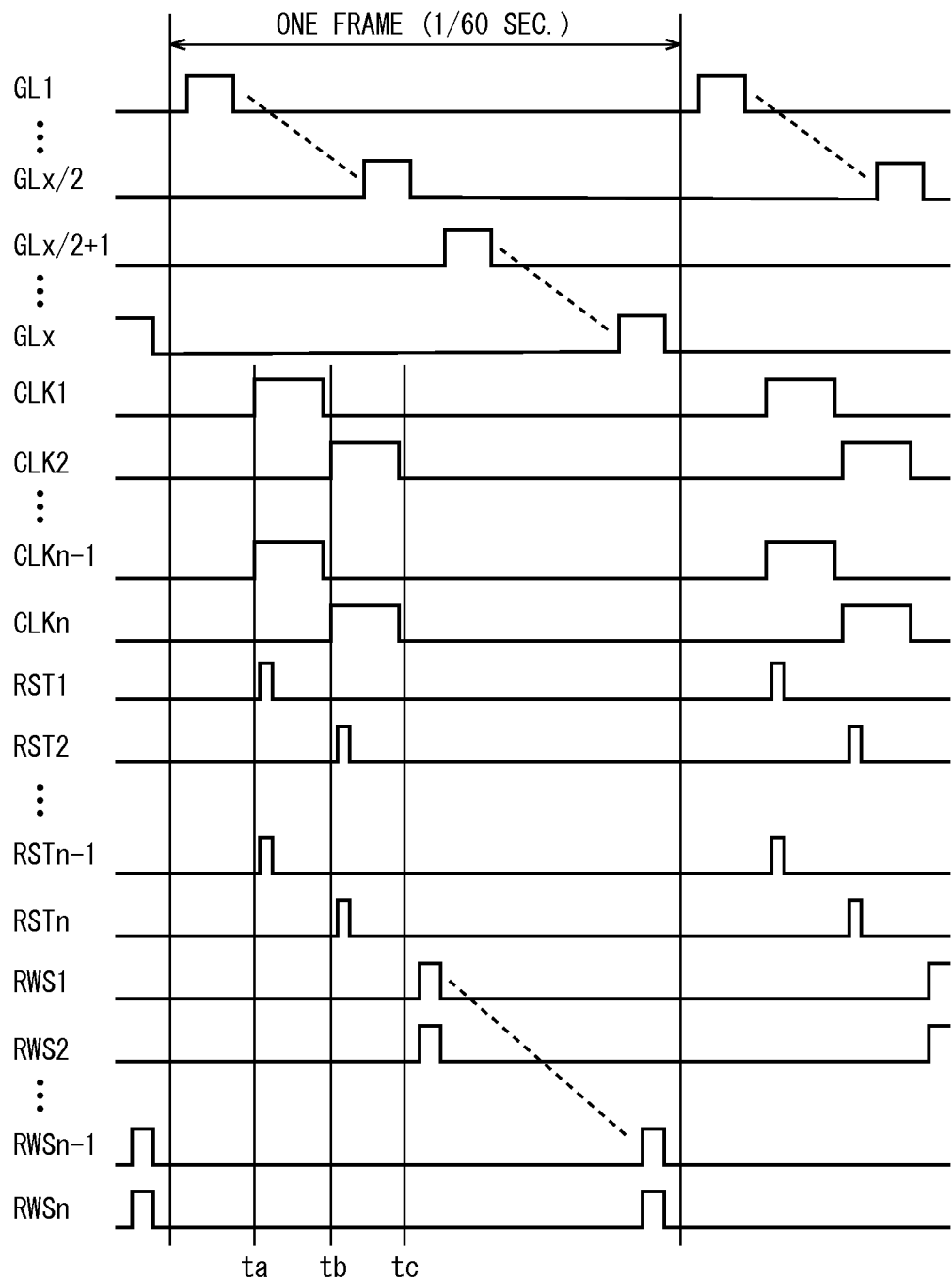
FIG. 4 is a signal waveform diagram for the display panel where the display device of FIG. 1 is driven once.

FIG. 4 is a signal waveform diagram for driving the display panel 2 in the timing shown in FIG. 3. As shown in FIG. 4, the potential on each of the gate lines GL1 to GLx sequentially goes high once in one frame, where it remains high for a predetermined period of time. The potential on an odd-numbered one of the clock lines CLK1 to CLKn−1 goes high once in one frame, where it remains high for period A1 (more specifically, from time ta to shortly before time tb). The potential on an even-numbered one of the clock lines CLK2 to CLKn goes high once in one frame, where it remains high for period A2 (more specifically, from time tb to shortly before time tc). The potential on an odd-numbered one of the reset lines RST1 to RSTn−1 goes high once in a frame, at around the beginning of period A1, where it remains high for a predetermined period of time. The potential on an even-numbered one of the reset lines RST2 to RSTn goes high once in one frame, at around the beginning of period A2, where it remains high for a predetermined period of time. The potential on each of the (n/2) pairs of readout lines RWS1 to RWSn sequentially goes high from shortly after time tc onward, where it remains high for a predetermined period of time.

Figure 5:
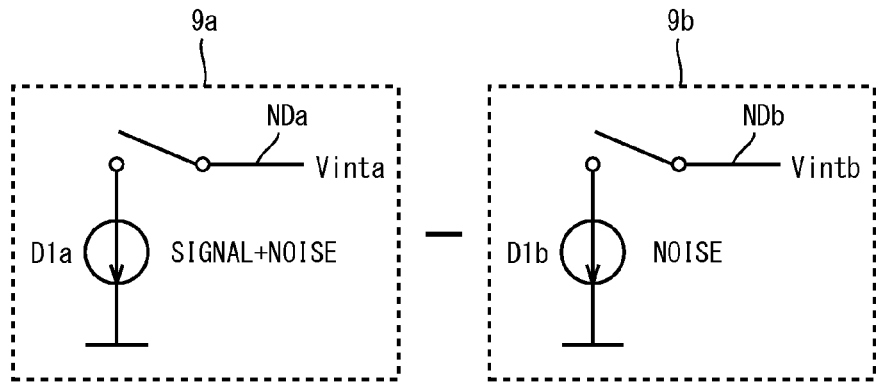
FIG. 5 schematically illustrates the sensor pixel circuits included in the display device of FIG. 1.

FIG. 5 schematically illustrates the sensor pixel circuits 9. As shown in FIG. 5, each first sensor pixel circuit 9a includes one photodiode D1a (light receiving element) and one accumulation node NDa. The photodiode Dla draws from the accumulation node NDa a charge corresponding to an amount of light (signal and noise) entering it while the infrared LEDs 3b are on (time ta to time tb). Similar to the first sensor pixel circuits 9a, each second sensor pixel circuit 9b includes one photodiode D1b and one accumulation node NDb. The photodiode D1b draws from the accumulation node NDb a charge corresponding to an amount of light (noise) entering it while the infrared LEDs 3b are off (time tb to time tc). A sensor signal corresponding to an amount of light entering the first sensor pixel circuit 9a during a detection period in which the infrared LEDs 3b are on is read out from the circuit. A sensor signal corresponding to an amount of light entering the second sensor pixel circuit 9b during a detection period in which the infrared LEDs 3b are off is read out from the circuit. As discussed above, a difference circuit included in the source driver circuit 6 may be used to calculate the difference between an output signal from the first sensor pixel circuit 9a and an output signal from the second sensor pixel circuit 9b, thereby determining the difference between the amount of light sensed when the backlight is on and the amount of light sensed when the backlight is off.

Any number of sensor pixel circuits 9 may be provided in the pixel region 4. However, it is preferable that the first sensor pixel circuits 9a and second sensor pixel circuits 9b are connected with different output lines. For example, if (n×m) sensor pixel circuits 9 are provided in the pixel region 4, n first sensor pixel circuits 9a may suitably be connected with each of the odd-numbered output lines OUT1 to OUTm−1 and n second sensor pixel circuits 9b may suitably be connected with each of the even-numbered output lines OUT2 to OUTm. In such cases, the sensor pixel circuits 9 are read in a row-by-row basis. Alternatively, the same number of sensor pixel circuits 9 as the color pixels (i.e. (x×y/3) circuits) may be provided in the pixel region 4. Alternatively, a number of sensor pixel circuits 9 that is smaller than that of the color pixels (for example, a number obtained by dividing the number of color pixels by several to several dozens) may be provided in the pixel region 4.

Thus, the display device according to embodiments of the present invention is a display device in which a plurality of photodiodes (light receiving elements) are provided in the pixel region 4, the display device including a display panel 2 having a plurality of display pixel circuits 8 and a plurality of sensor pixel circuits 9, and a sensor row driver circuit 7 (driver circuit) for outputting, to the sensor pixel circuits 9, a clock signal CLK (control signal) indicating a detection period in which the backlight is on and a detection period in which the backlight is off. The sensor pixel circuits 9 included in the display device will be described below. In the description below, "sensor pixel circuit" is abbreviated to "pixel circuit", and a signal on a signal line is identified by the same name as the signal line itself (for example, a signal on the clock line CLKa is referred to as "clock signal CLKa").

The first sensor pixel circuits 9a are connected with clock lines CLKa, reset lines RSTa, readout lines RWSa, power supply lines VDDa and output lines OUTa. The second sensor pixel circuits 9b are connected with clock lines CLKb, reset lines RSTb, readout lines RWSb, power supply lines VDDb and output lines OUTb. Since in these embodiments the second sensor pixel circuits 9b have the same configuration as, and work similarly to, the first sensor pixel circuits 9a, part of the description of the second sensor pixel circuits 9b will be omitted.

Figure 6:
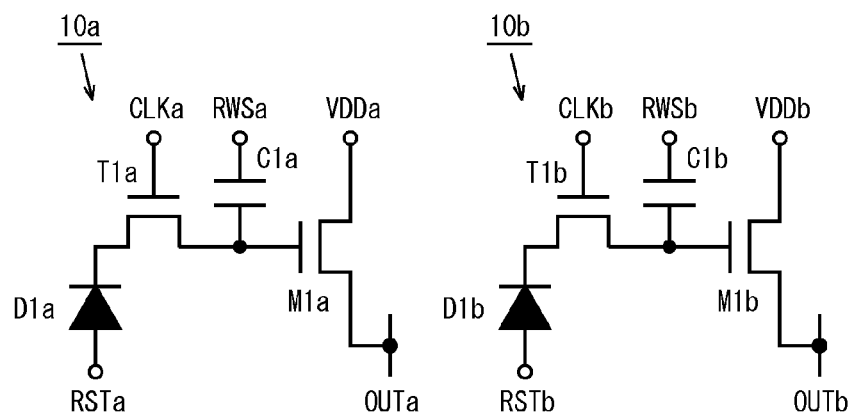
FIG. 6 shows circuit diagrams of the sensor pixel circuits according to a first embodiment of the present invention.

FIG. 6 is a circuit diagram illustrating a specific configuration of the first sensor pixel circuits 9a and second sensor pixel circuits 9b. In the present embodiment, a first pixel circuit 10a shown in FIG. 6 is an implementation of the first sensor pixel circuits 9a, while a second pixel circuit 10b is an implementation of the second sensor pixel circuits 9b. As shown in FIG. 6, the first pixel circuit 10a includes transistors T1a (retaining switching element) and M1a, photodiode D1a and capacitor C1a. The second pixel circuit 10b includes transistors T1b and M1b, photodiode D1b and capacitor C1b. The transistors T1a, M1a, T1b and M1b are n-type thin film transistors (TFTs).

In the first pixel circuit 10a, the photodiode D1a has an anode connected with the reset line RSTa and a cathode connected with the source of the transistor T1a. The transistor T1a has a gate connected with the clock line CLKa and a drain connected with the gate of the transistor M1a. The transistor M1a has a drain connected with the power supply line VDDa and a source connected with the output line OUTa. The capacitor C1a is provided between the gate of the transistor M1a and the readout line RWSa. In the first pixel circuit 10a, the node connected with the gate of the transistor M1a serves as an accumulation node that accumulates a charge corresponding to an amount of light sensed, and the transistor M1a functions as a readout transistor. The second pixel circuit 10b has the same configuration as the first pixel circuit 10a.

Figure 7:
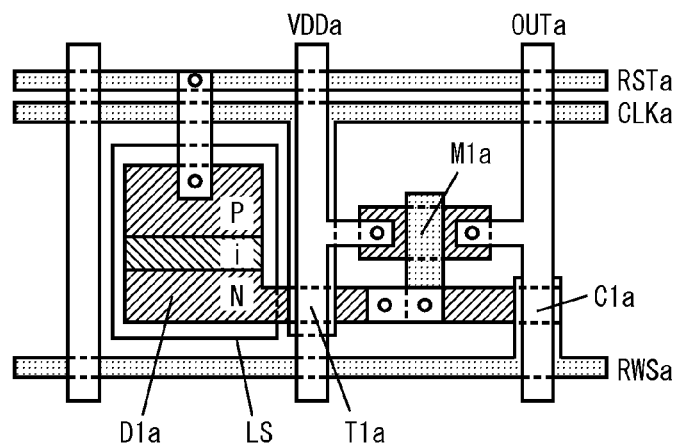
FIG. 7 is a layout of the sensor pixel circuits of FIG. 6.

FIG. 7 is a layout of the first pixel circuit 10a. As shown in FIG. 7, the first pixel circuit 10a is constructed by forming, on a glass substrate, a light shielding film LS, a semiconductor layer (hatched portion), a gate wiring layer (dotted portion), and a source wiring layer (white portion) in the stated order. Contacts (indicated by white circles) are provided where the semiconductor layer is connected with the source wiring layer and where the gate wiring layer is connected with the source wiring layer. The transistors T1a and M1a are formed by disposing the semiconductor layer and gate wiring layer such that they cross each other. The photodiode D1a is formed by disposing semiconductor layers, i.e. a p-layer, i-layer and n-layer, side by side. The capacitor C1a is formed by disposing the semiconductor layer and gate wiring layer in an overlying relationship. The light shielding film LS is made of metal and prevents light that has entered the substrate through its back side from entering the photodiode D1a. The second pixel circuit 10b is laid out in a similar manner to the first pixel circuit 10a. The first and second pixel circuits 10a and 10b may be laid out differently, as well.

Figure 8:
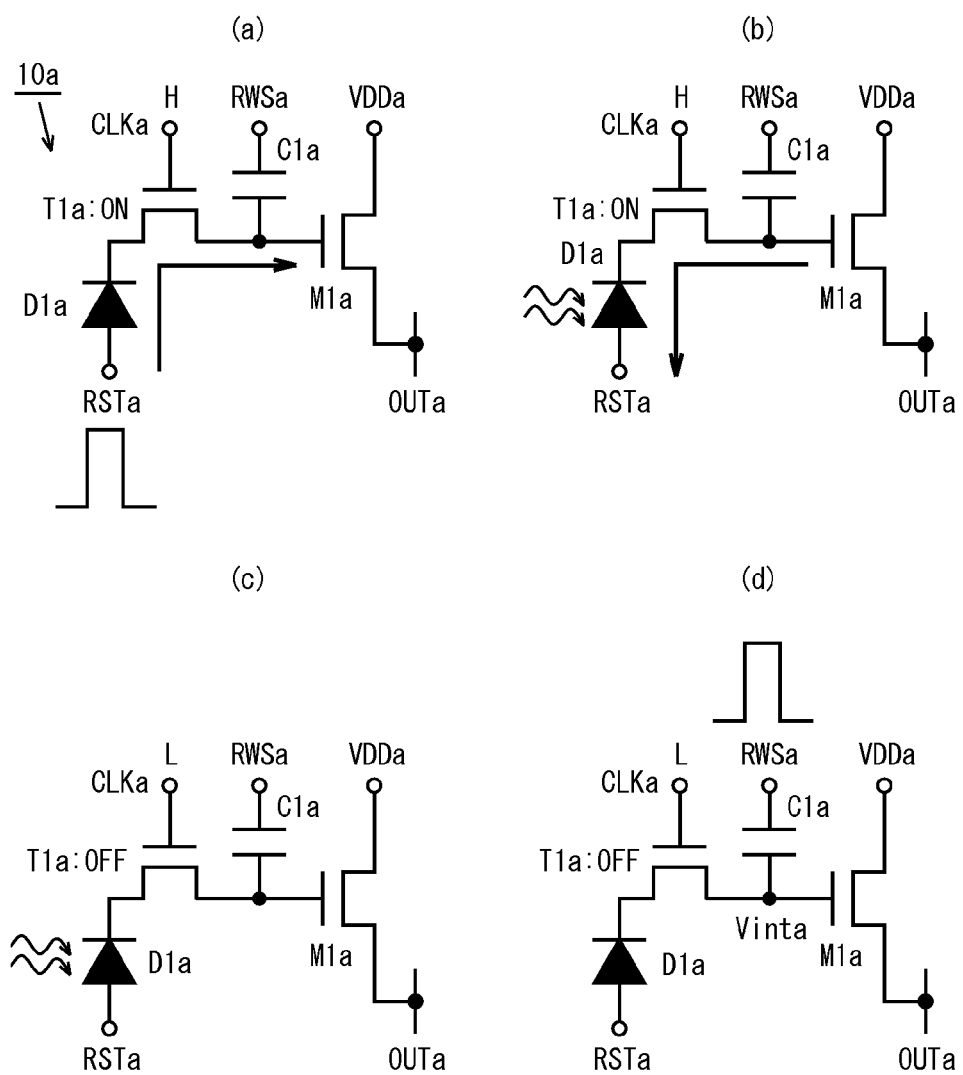
FIG. 8 illustrates the operations of one of the sensor pixel circuits of FIG. 6.

FIG. 8 illustrates the operations of the first pixel circuit 10a where it is driven by the signals shown in FIG. 4. As shown in FIG. 8, the first pixel circuit 10a performs (a) reset, (b) accumulation, (c) retention and (d) readout in one frame.

Figure 9:
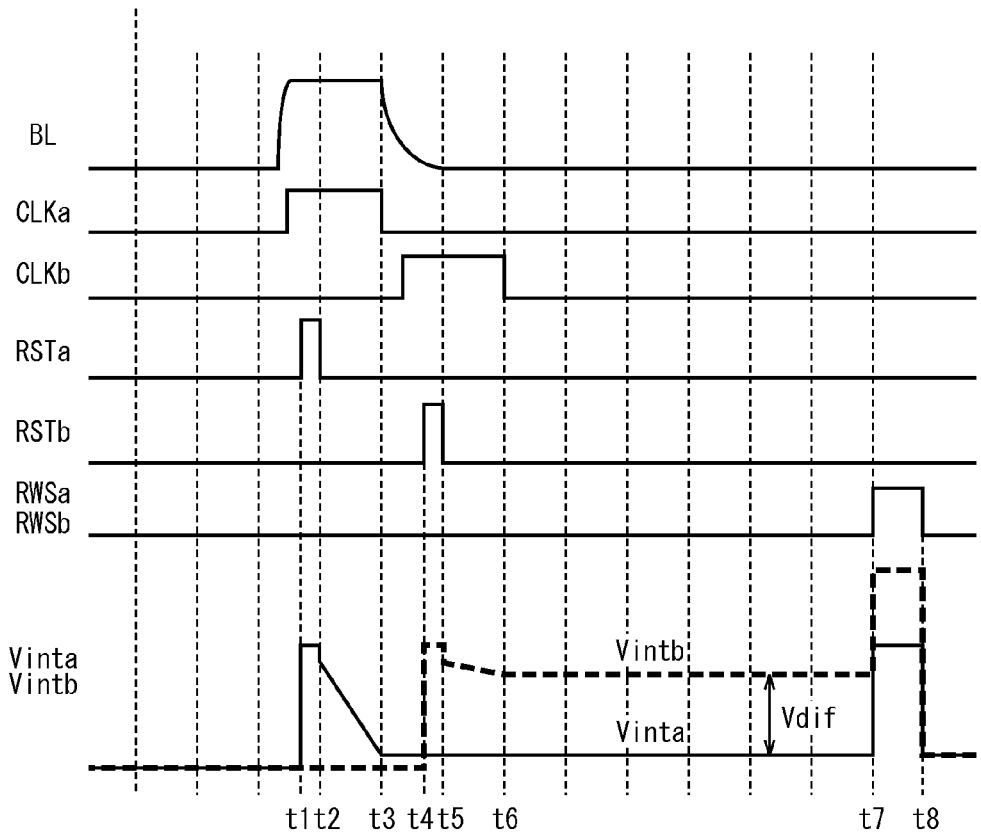
FIG. 9 is a signal waveform diagram for the sensor pixel circuits of FIG. 6.

FIG. 9 is a signal waveform diagram for the first pixel circuit 10a and second pixel circuit 10b where it is driven by the signals shown in FIG. 4. In FIG. 9, BL represents the brightness of the infrared LEDs 3b, Vinta the potential on the accumulation node of the first pixel circuit 10a (potential on the gate of the transistor M1a), and Vintb the potential on the accumulation node of the second pixel circuit 10b (potential on the gate of the transistor M1b). For the first pixel circuit 10a, times t1 and t2 define the reset period, times t2 and t3 the accumulation period, times t3 and t7 the retention period, and times t7 and t8 the readout period. For the second pixel circuit 10b, times t4 and t5 define the reset period, times t5 and t6 the accumulation period, times t6 and t7 the retention period, and times t7 and t8 the readout period.

During the reset period of the first pixel circuit 10a, the clock signal CLKa is high, the readout signal RWSa is low, the reset signal RSTa is high for reset. During this period, the transistor T1a is on. Consequently, a current (forward with respect to the photodiode D1a) flows from the reset line RSTa through the photodiode D1a and transistor T1a to the accumulation node (FIG. 8(a)), resetting the potential Vinta to a predetermined level.

During the accumulation period of the first pixel circuit 10a, the clock signal CLKa is high, and the reset signal RSTa and readout signal RWSa are low. During this period, the transistor T1a is on. If light impinges on the photodiode D1a during this period, a current (photocurrent of the photodiode D1a) flows from the accumulation node through the transistor T1a and photodiode D1a to the reset line RSTa, drawing charge from the accumulation node (FIG. 8(b)). Thus, the potential Vinta decreases according to the amount of light impinging on the photodiode while the clock signal CLKa is high (i.e. while the infrared LEDs 3b are on).

During the retention period of the first pixel circuit 10a, the clock signal CLKa, reset signal RSTa and readout signal RWSa are low. During this period, the transistor T1a is off. If light impinges on the photodiode D1a during this period, the potential Vinta does not change since the transistor T1a is off such that the photodiode D1a and the gate of the transistor M1 are electrically disconnected from each other (FIG. 8(c)).

During the readout period of the first pixel circuit 10a, the clock signal CLKa and reset signal RSTa are low, and the readout signal RWSa is high for readout. During this period, the transistor T1a is off. During this period, the potential Vinta increases by the amount of increase in the potential of the readout signal RWSa multiplied by (Cqa/Cpa), where Cpa is the capacitance of the entire first pixel circuit 10a and Cqa is the capacitance of the capacitor C1a. The transistor M1a constitutes a source follower amplifier circuit where a transistor (not shown) included in the source driver circuit 6 serves as a load, driving the output line OUTa according to the potential Vinta (FIG. 8(d)).

The second pixel circuit 10b operates in a similar manner to the first pixel circuit 10a. During the reset period, the potential Vintb is reset to a predetermined level; during the accumulation period, it decreases according to the amount of light impinging on the photodiode while the clock signal CLKb is high (i.e. while the infrared LEDs 3b are off), and it remains unchanged during the retention period. During the readout period, the potential Vintb increases by the amount of increase in the potential of the readout signal RWSb multiplied by (Cqb/Cpb), where Cpb is the capacitance of the entire second pixel circuit 10b and Cqb is the capacitance of the capacitor C1b, and the transistor M1b drives the output line OUTb according to the potential Vintb.

As discussed above, the first pixel circuit 10a according to the present embodiment includes one photodiode D1a (photosensor), one accumulation node that accumulates a charge corresponding to an amount of light sensed, a transistor M1a (readout transistor) having a control terminal connected with the accumulation node, and a transistor T1a (retaining switching element) provided on the path of current passing through the photodiode D1a and is turned on and off in response to a clock signal CLK. The transistor T1a is provided between the accumulation node and one end of the photodiode D1a, and the other end of the photodiode D1a is connected with a reset line RSTa. The transistor T1a is turned on in response to a clock signal CLKa and remains on during a detection period in which the backlight is on. The second pixel circuit 10b has a configuration similar to that of the first pixel circuit 10a, and the transistor T1b included in the second pixel circuit 10b is on during a detection period in which the backlight is off.

Thus, a transistor T1a that is on during a detection period in which the backlight is on may be provided on the path of current passing through the photodiode D1a, and a transistor T1b that is on during a detection period in which the backlight is off may be provided on the path of current passing through the photodiode D1b, thereby providing a first pixel circuit 10a that detects light during a detection period in which the backlight is on and memorizes the amount of detected light in other periods and a second pixel circuit 10b that detects light during a detection period in which the backlight is off and memorizes the amount of detected light in other periods.

[Exemplary Configurations of Backlight 3]

Now, several specific exemplary configurations of the backlight 3 of the present embodiment will be described. FIGS. 10 to 14 each illustrate an exploded perspective view of an exemplary configuration of the backlight 3. FIG. 15 is a schematic cross-sectional view of the backlight 3 of FIG. 14.

In the backlight 3 of each of FIGS. 10 to 14, two lens sheets 61 and 62 and diffuser sheet 63 are provided on or above one side of the light guide plate 64 or 74, while a reflector sheet 65 or 72 is provided on the other side.

Figure 10:
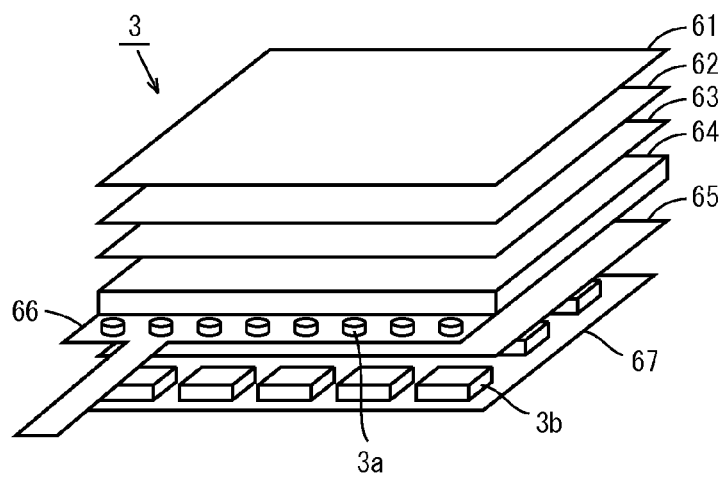
FIG. 10 is an exploded perspective view of an implementation of the backlight.

In the backlight 3 shown in FIG. 10, a flexible printed circuit board 66 with white LEDs 3a arranged in a one-dimensional manner is provided on a lateral face of the light guide plate 64. The infrared LEDs 3b are arranged on a circuit board 67 in a two-dimensional manner. The circuit board 67 is provided on the back side of the reflector sheet 65. The reflector sheet 65 is formed of a sheet that passes infrared light and reflects visible light. Such sheets may include a reflector sheet formed of a polyester-based resin, for example.

Figure 11:
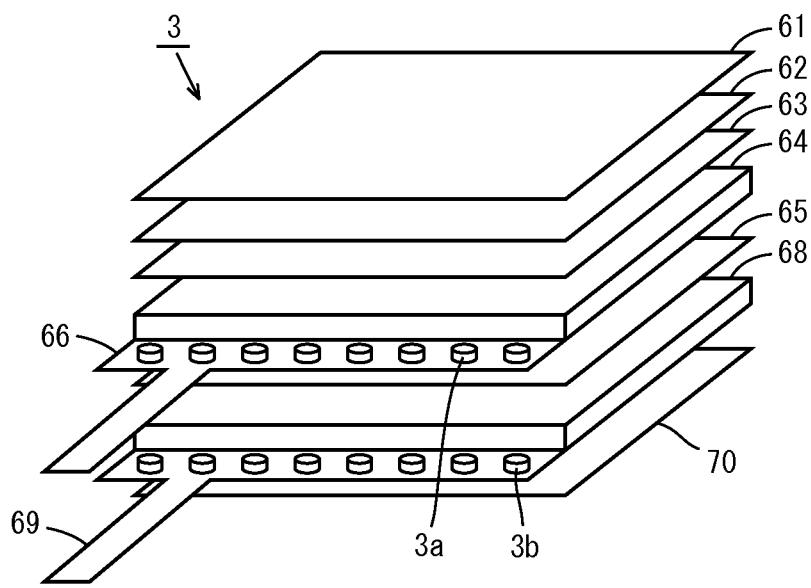
FIG. 11 is an exploded perspective view of another implementation of the backlight.

Similarly, in the backlight 3 shown in FIG. 11, a flexible printed circuit board 66 with white LEDs 3a arranged in a one-dimensional manner is provided on a lateral face of the light guide plate 64. In addition to the light guide plate 64, the backlight 3 shown in FIG. 11 includes another light guide plate 68. Infrared LEDs 3b are arranged on a flexible circuit board 69 in a one-dimensional manner and provided on a lateral face of the light guide plate 68. In the backlight 3 of FIG. 11, a reflector sheet 70 is provided on the back side of the light guide plate 68. The reflector sheet 70 is formed of a sheet that reflects infrared light. In the backlight 3 shown in FIG. 11, a light guide plate 68, infrared LEDs 3b, flexible printed circuit board 69 and reflector sheet 70 may be added to a backlight that uses white LEDs 3a as light sources to emit visible light (i.e. from the lens sheet 61 to the reflector sheet 65) to provide a backlight 3 that emits both visible and infrared light using a visible light backlight configuration.

Figure 12:
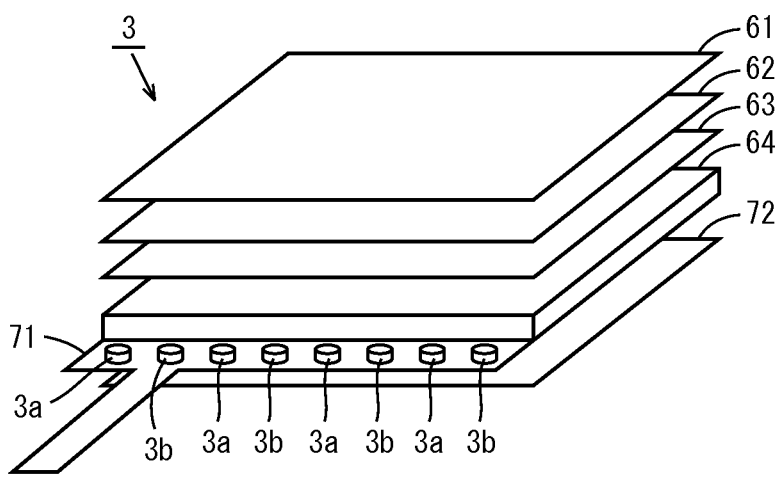
FIG. 12 is an exploded perspective view of yet another implementation of the backlight.

In the backlight 3 shown in FIG. 12, a flexible printed circuit board 71 with white LEDs 3a and infrared LEDs 3b mixed together and arranged in a one-dimensional manner is provided on a lateral face of the light guide plate 64. The white LEDs 3a and infrared LEDs 3b may be arranged on the flexible printed circuit board 71 in an alternated manner. The reflector sheet 72 may be a sheet that reflects both visible and infrared light. Thus, white LEDs 3a and infrared LEDs 3b may be mixed together and located along a lateral face of the light guide plate 64 to provide a backlight 3 that emits both visible and infrared light using something similar to a visible light backlight configuration.

Figure 13:
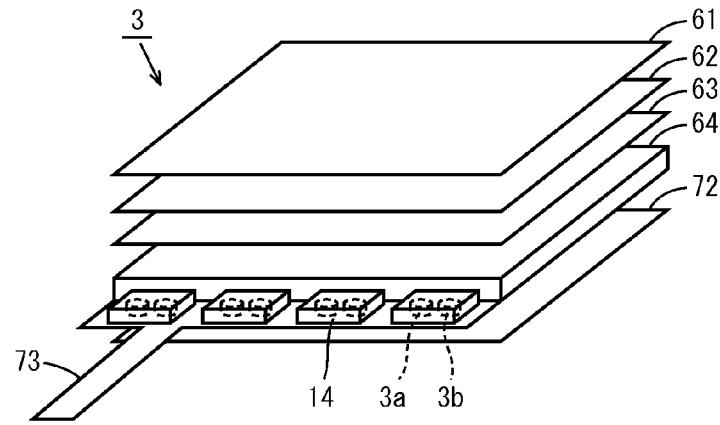
FIG. 13 is an exploded perspective view of still another implementation of the backlight.

In the backlight 3 shown in FIG. 13, a white LED 3a and infrared LED 3b are encapsulated in a single resin package 14. A flexible printed circuit board 73 with such resin packages 14 arranged in a one-dimensional manner is provided on a lateral face of the light guide plate 64. Thus, white LEDs 3a and infrared LEDs 3b may be encapsulated in resin packages 14 to allow multiple LED emitters to be located in a small space. It should be noted that one or more white LEDs 3a and one or more infrared LEDs 3b may be encapsulated in a single resin package 14.

Figure 14:
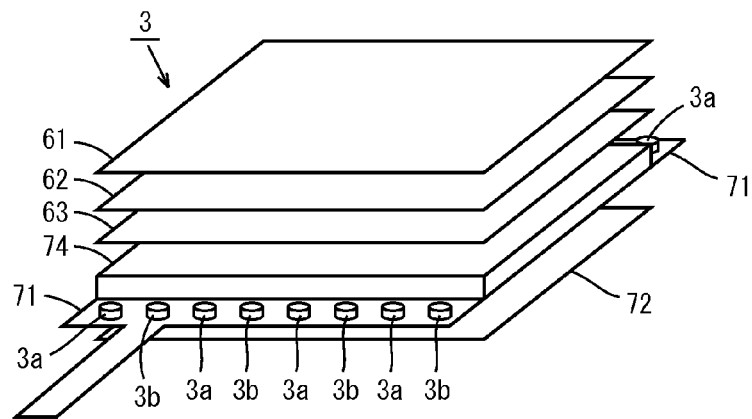
FIG. 14 is an exploded perspective view of yet another implementation of the backlight.
Figure 15:
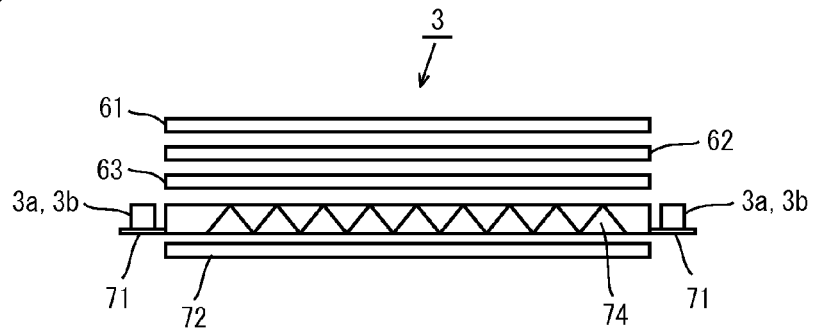
FIG. 15 is a schematic cross-sectional view of the backlight of FIG. 14.

In the backlight 3 shown in FIG. 14, a flexible printed circuit board 71 with white LEDs 3a and infrared LEDs 3b mixed together and arranged in a one-dimensional manner is provided on one lateral face of the light guide plate 74. Another flexible printed circuit board 71 with white LEDs 3a and infrared LEDs 3b mixed together and arranged in a one-dimensional manner is provided on the lateral face of the light guide plate 74 opposite the one lateral side above.

FIG. 15 is a cross-sectional view of the backlight 3 of FIG. 14. The light guide plate 74 is treated so as to be capable of conveying white light and infrared light entering it from one lateral face and white light and infrared light entering it from the other lateral face. Thus, white LEDs 3a and infrared LEDs 3b are located along two opposite lateral faces of the light guide plate 74 such that these two types of LEDs share the light guide plate 74 and other backlight components. This realizes, in a more compact manner, a backlight 3 that emits both visible light and infrared light.

[Timing of on and Off of White LEDs 3a and Infrared LEDs 3b]

The timing of on and off of white LEDs 3a and infrared LEDs 3b in the display device of the present embodiment will be described with reference to specific examples. The timing of on and off of white LEDs 3a and infrared LEDs 3b is controlled by the drive currents CS3a and CS3b supplied to the backlight 3 from the backlight control circuit 13.

FIGS. 16 to 19 are signal waveform diagrams illustrating examples of the drive currents CS3a and CS3b output from the backlight control circuit 13 to the backlight 3. In each of FIGS. 16 to 19, the upper section shows a waveform of the drive current CS3a that controls the timing of on and off of the white LEDs 3a, while the lower section shows a waveform of the drive current CS3b that controls the timing of on and off of the infrared LEDs 3b.

Figure 16:
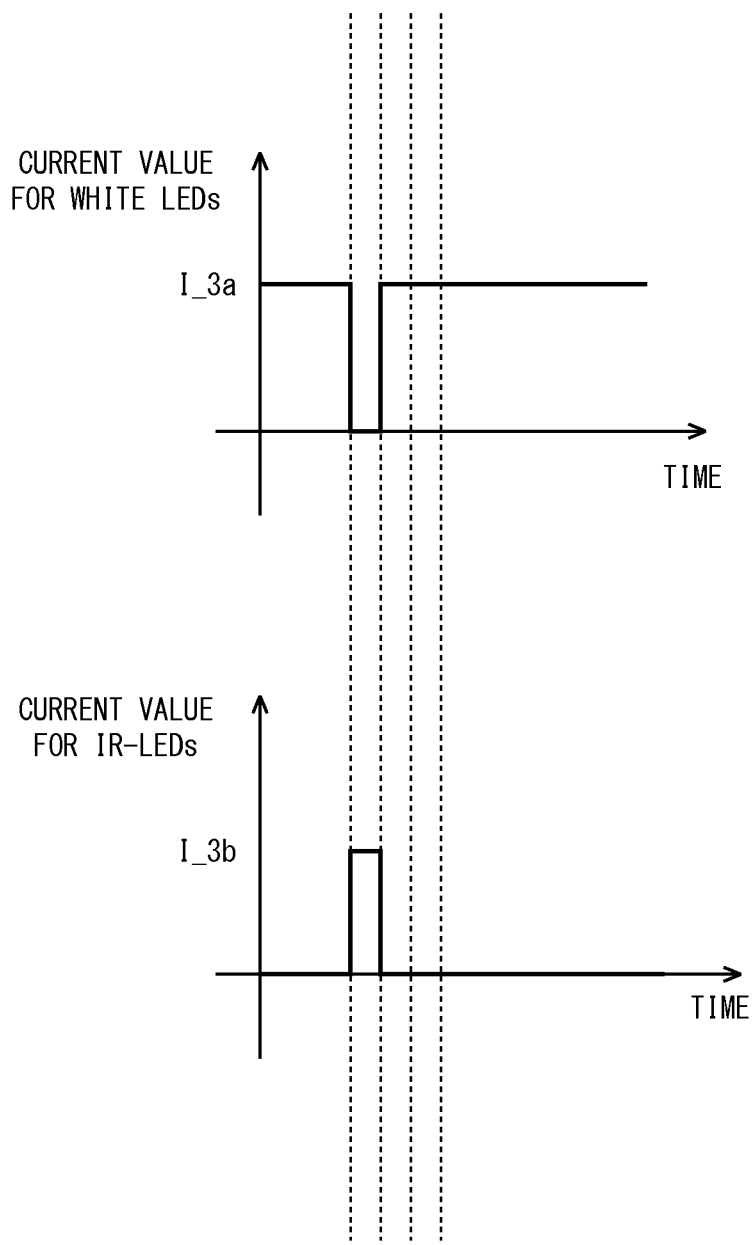
FIG. 16 is a signal waveform diagram illustrating drive current output from the backlight control circuit to the backlight.

In the implementation shown in FIG. 16, as shown in the upper section, the value of the drive current CS3a supplied to the white LEDs 3a is zero during a period in which the drive current CS3b, at a current value of I_3b, is supplied to the infrared LEDs 3b (i.e. the infrared LEDs 3b are on), as shown in the lower section. The period in which the drive current CS3b, at a current value of I_3b, is supplied to the infrared LEDs 3b corresponds to period A1, from time ta to time tb, shown in FIG. 3. In this implementation, the drive current CS3a supplied to the white LEDs 3a is kept at a constant value of I_3a except in the period in which the infrared LEDs 3b are on. The current values I_3a and I_3b are preferably set such that the sum of the amount of power for the white LEDs 3a and the amount of power for the infrared LEDs 3b remains constant.

Figure 17:
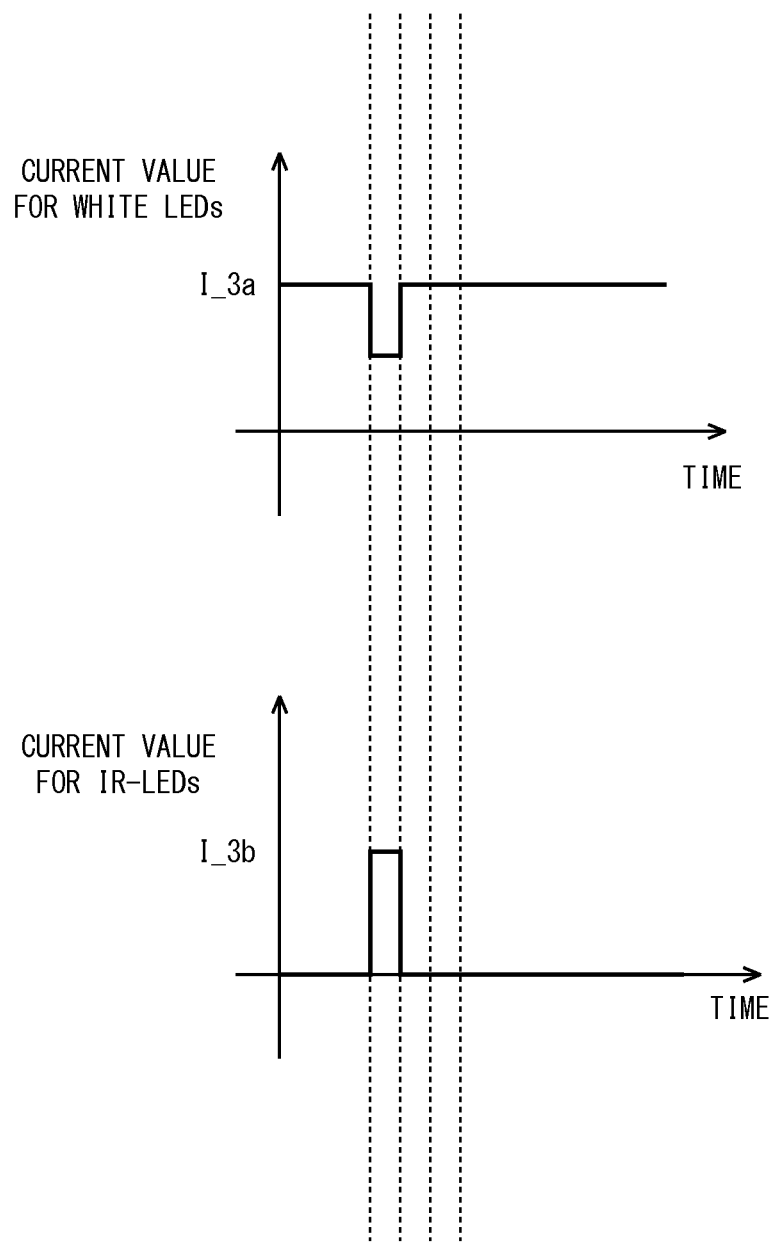
FIG. 17 is a signal waveform diagram illustrating drive current output from the backlight control circuit to the backlight.

In the implementation shown in FIG. 17, as shown in the upper section, the value of the drive current CS3a supplied to the white LEDs 3a is I_3a', which is smaller than the normal on-current value I_3a, during a period in which the drive current CS3b, at a current value of I_3b, is supplied to the infrared LEDs 3b (i.e. the infrared LEDs 3b are on), as shown in the lower section. In this implementation, too, the period in which the drive current CS3b at a current value of I_3b is supplied to the infrared LEDs 3b corresponds to period A1, from time ta to time tb, shown in FIG. 3. Further, in this implementation, too, the drive current CS3a supplied to the white LEDs 3a is kept at a constant value of I_3a except in the period in which the infrared LEDs 3b are on. The current values I_3a and I_3a' and I_3b are preferably set such that the sum of the amount of power for the white LEDs 3a and the amount of power for the infrared LEDs 3b does not fluctuate excessively when the infrared LEDs 3b are turned on.

Figure 18:
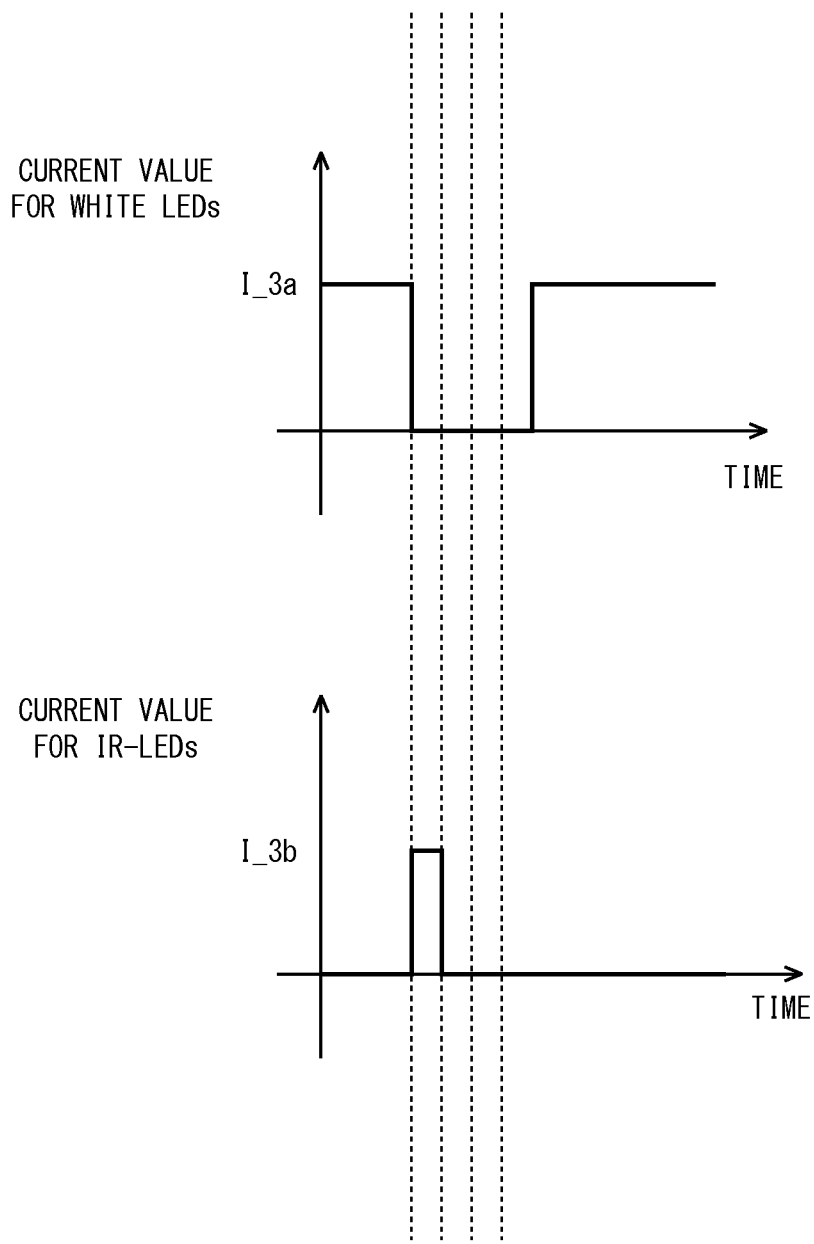
FIG. 18 is a signal waveform diagram illustrating drive current output from the backlight control circuit to the backlight.

In the implementation shown in FIG. 18, as shown in the upper section, the value of drive current CS3a supplied to the white LEDs 3a becomes zero at the same time as the drive current CS3b, at a current value of I_3b, begins to be supplied to the infrared LEDs 3b (i.e. the infrared LEDs 3b are turned on), as shown in the lower section. In this implementation, too, the period in which the drive current CS3b at a current value of I_3b is supplied to the infrared LEDs 3b corresponds to period A1, from time ta to time tb, shown in FIG. 3. In this implementation, the value of the drive current CS3a supplied to the white LEDs 3a is kept at zero for a while even after the period in which the infrared LEDs 3b are on is completed. For example, in the implementation of FIG. 18, after the period in which the infrared LEDs 3b are on (period A1, from time ta to time tb, shown in FIG. 3) is completed, the value of the drive current CS3a supplied to the white LEDs 3a is kept at zero for a period about three times as long as period A1. The current values I_3a and I_3b are preferably set such that, when the infrared LEDs 3b are turned on, the sum of the amount of power for the white LEDs 3a and the amount of power for the infrared LEDs 3b does not fluctuate relative to that directly before the infrared LEDs are turned on. Although in the implementation of FIG. 18 the value of the drive current CS3a supplied to the white LEDs 3a is zero for a while after the infrared LEDs 3b are turned on, the value of current may be larger than zero and smaller than the normal on-current value I_3a, similar to the implementation shown in FIG. 17.

Figure 19:
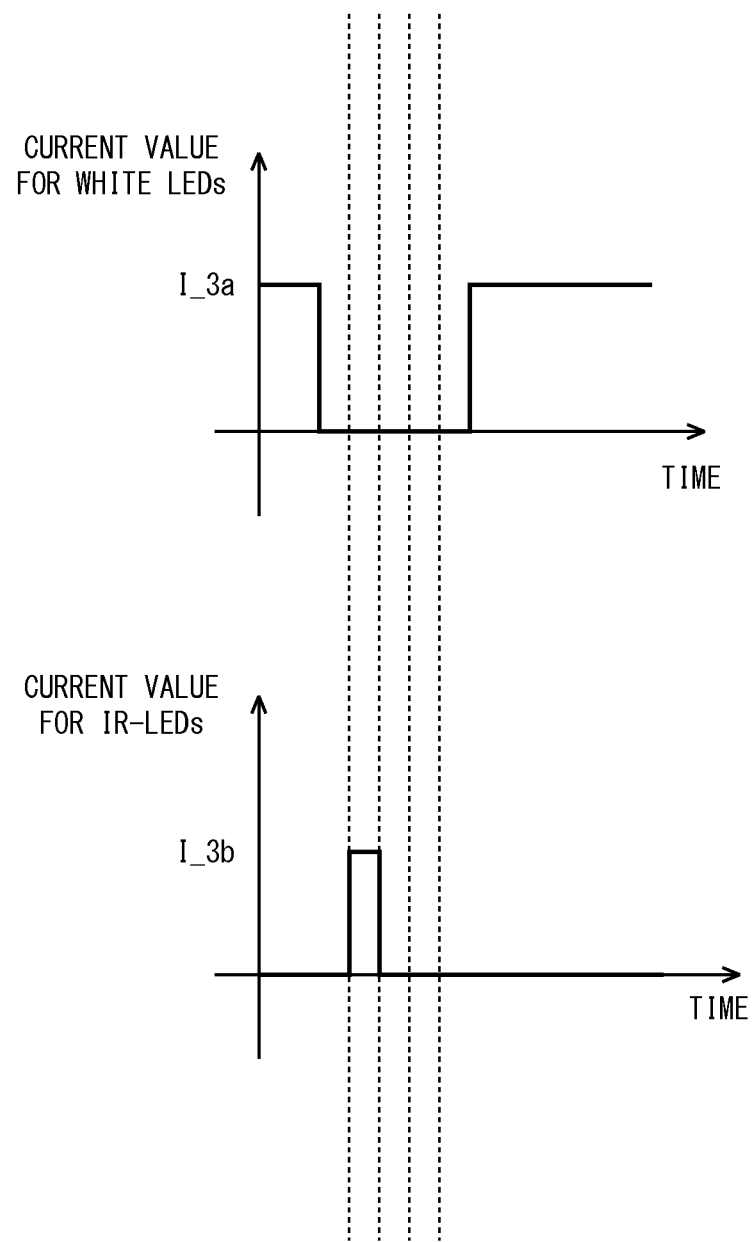
FIG. 19 is a signal waveform diagram illustrating drive current output from the backlight control circuit to the backlight.

In the implementation shown in FIG. 19, as shown in the upper section, the value of the drive current CS3a supplied to the white LEDs 3a becomes zero shortly before the drive current CS3b, at a current value of I_3b, begins to be supplied to the infrared LEDs 3b (i.e. the infrared LEDs 3b are turned on), as shown in the lower section. In the implementation of FIG. 19, the period from the time when the value of the drive current CS3a supplied to the white LEDs 3a becomes zero to the time when the infrared LEDs 3b begin to be on is substantially as long as the period in which the infrared LEDs 3b are on (period A1, from time ta to time tb, shown in FIG. 3). In this implementation, too, the period in which the drive current CS3b at a current value of I_3b is supplied to the infrared LEDs 3b corresponds to period A1, from time ta to time tb, shown in FIG. 3. Similar to the implementation of FIG. 18, in this implementation, the value of the drive current CS3a supplied to the white LEDs 3a is kept at zero for a while even after the period in which the infrared LEDs 3b are on is completed. For example, in the implementation of FIG. 19, after the period in which the infrared LEDs 3b are on is completed, the value of the drive current CS3a supplied to the white LEDs 3a is kept at zero for a period about three times as long as period A1. In the implementation of FIG. 19, the white LEDs 3a may be turned off at any point of time and be off for any period of time as long as it does not affect display, such as within a flyback period or the like. The current values I_3a and I_3b are preferably set such that the sum of the amount of power for the white LEDs 3a and the amount of power for the infrared LEDs 3b when the infrared LEDs 3b are turned on does not fluctuate relative to the value used when the white LEDs 3a are on. Although in the implementation of FIG. 19, too, the value of the drive current CS3a supplied to the white LEDs 3a is zero for a while after the infrared LEDs 3b are turned on, the value of current may be larger than zero and smaller than the normal on-current value I_3a, similar to the implementation shown in FIG. 17.

Figure 20:
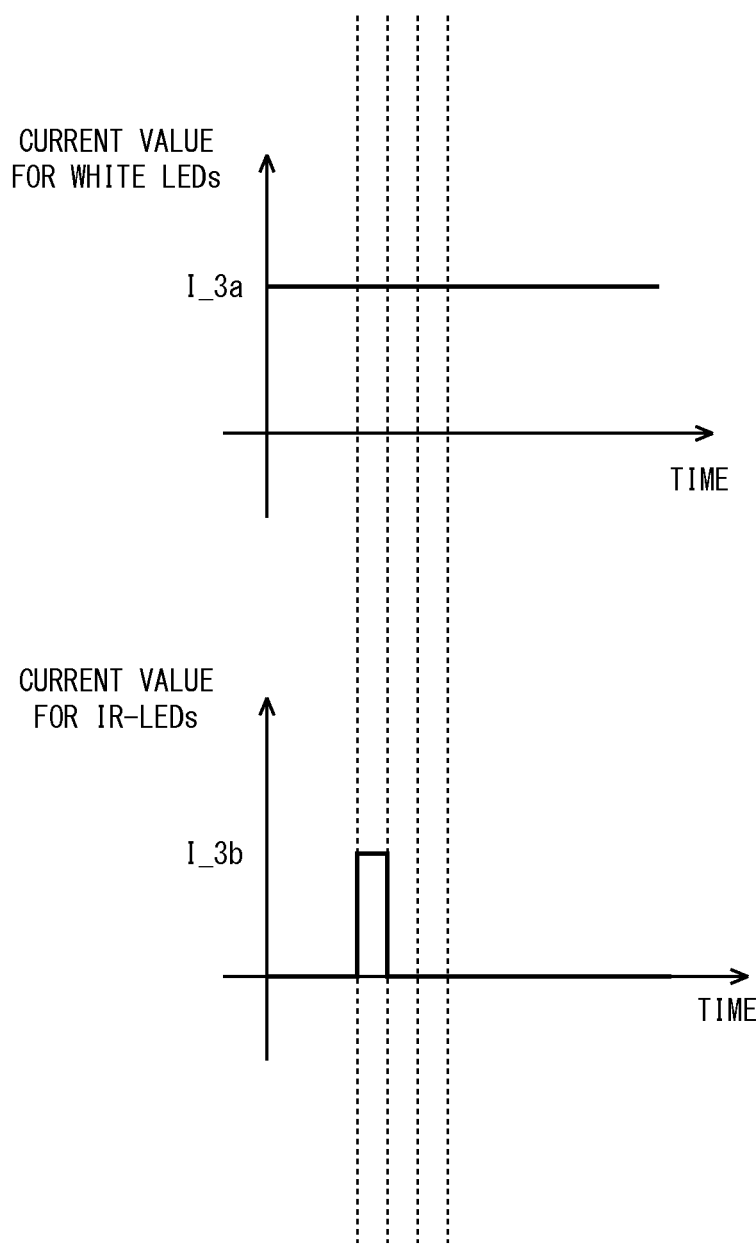
FIG. 20 is a signal waveform diagram of drive current where the white LEDs are kept on even while the infrared LEDs are on, as a comparative example in contrast to the implementations of FIGS. 16 to 19.

FIG. 20 is a signal waveform diagram of the drive current CS3a and CS3b used when the white LEDs 3a are kept on even while the infrared LEDs 3b are on, to illustrate a comparative example that is in contrast to the implementations shown in FIGS. 16 to 19.

When the implementation of a backlight 3 driven by the drive currents CS3a and CS3b shown in FIG. 16 is compared with the comparative example shown in FIG. 20, a momentary voltage drop occurring at the backlight 3 while the infrared LEDs 3b are on may be prevented when the backlight is driven by the drive currents shown in FIG. 16. This will prevent problems such as decreased brightness of the white LEDs 3a, insufficient infrared light intensity of the infrared LEDs 3b or malfunctions of the drive circuit. Further, according to the implementation shown in FIG. 16, the value of the drive current for the white LEDs 3a may be zero when the infrared LEDs 3b are on to increase the upper limit for the value of the current I_3b supplied to the infrared LEDs 3b accordingly. This will increase the infrared light intensity of the infrared LEDs 3b.

Similar to the implementation shown in FIG. 16, the implementation shown in FIG. 17, too, may prevent a momentary voltage drop occurring at the backlight 3 while the infrared LEDs 3b are on. This will prevent problems such as decreased brightness of the white LEDs 3a, insufficient infrared light intensity of the infrared LEDs 3b or malfunctions of the drive circuit. Further, similar to the implementation shown in FIG. 16, the upper limit for the value of the current I_3b supplied to the infrared LEDs 3b may be increased to increase the infrared light intensity of the infrared LEDs 3b.

Similar to the implementations shown in FIGS. 16 and 17, the implementation shown in FIG. 18 will increase the upper limit for the value of current I_3b supplied to the infrared LEDs 3b to increase the infrared light intensity of the infrared LEDs 3b. Further, according to the implementation shown in FIG. 18, the white LEDs 3a are off during the period A2 shown in FIG. 3 such that output signals from the second sensor pixel circuits 9b performing sensing in period A2 are not affected by light emitted by the white LEDs 3a and only contain noise components. Thus, more accurate sensor outputs may be obtained by subtracting output signals from the second sensor pixel circuits 9b from output signals from the first sensor pixel circuits 9a.

Similar to the implementations shown in FIGS. 16 to 18, the implementation shown in FIG. 19 will increase the upper limit for the value of current I_3b supplied to the infrared LEDs 3b to increase the infrared light intensity of the infrared LEDs 3b. Further, according to the implementation shown in FIG. 19, similar to the implementation shown in FIG. 18, the white LEDs 3a are off during period A2 shown in FIG. 3, thereby providing more accurate sensor outputs. Furthermore, the white LEDs 3a are turned off before the infrared LEDs 3b are turned on (beginning of period A1) such that only reflected light emitted from the infrared LEDs 3b is detected in period A1, thereby providing still more accurate sensor outputs. In addition, according to the implementation shown in FIG. 19, the white LEDs 3a are off for a longer period of time than according to the implementations of FIGS. 16 to 18, reducing the power consumption of the white LEDs 3a.

[Configuration of the Backlight Control Circuit 13]

Figure 21:
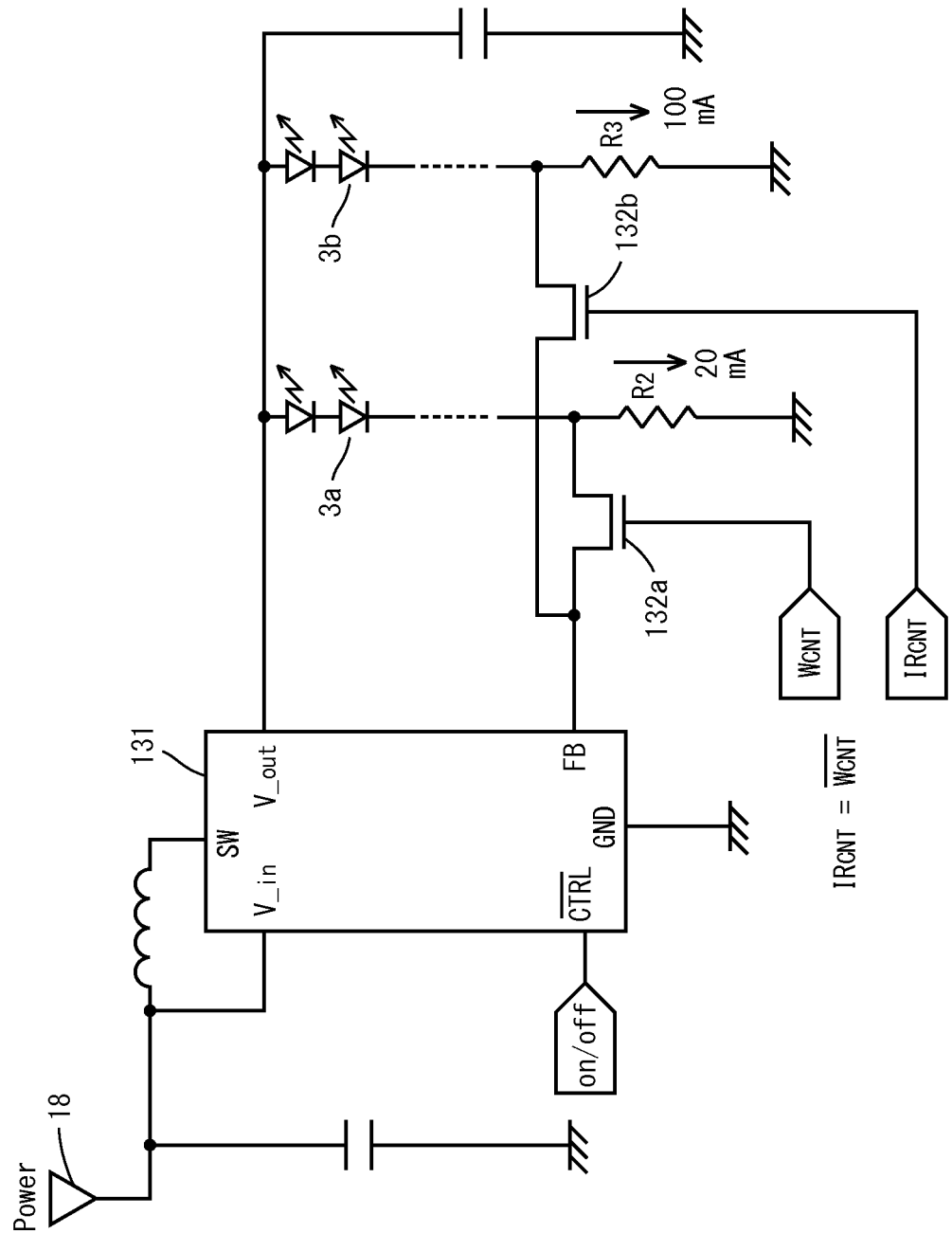
FIG. 21 is a schematic circuit diagram of the backlight control circuit.

Referring to FIG. 21, an exemplary configuration of the backlight control circuit 13 according to the present embodiment will be described. FIG. 21 is a circuit diagram schematically illustrating the backlight control circuit 13 for controlling the backlight 3 using drive currents that vary as shown in FIG. 16.

As shown in FIG. 21, the backlight control circuit 13 receives a voltage supply from an external power supply 18. The backlight control circuit 13 includes a power supply control circuit 131 and switching elements 132a and 132b. Signals such as an on/off signal, $W_{CNT}$ signal and $IR_{CNT}$ signal shown in FIG. 21, which implement the control signal CSb of FIG. 1, are fed into the backlight control circuit 13.

The on/off signal controls on and off of the power supply control circuit 131. The $W_{CNT}$ signal is imposed on the gate electrode of the switching element 132a to control on and off of the switching element 132a. The $IR_{CNT}$ signal is imposed on the gate electrode of the switching element 132b to control on and off of the switching element 132b. The $W_{CNT}$ and $IR_{CNT}$ signals have opposite polarities. Consequently, if one of the $W_{CNT}$ and $IR_{CNT}$ signals is on (i.e. high), the other is off (i.e. low). The source electrode of the switching element 132a is connected with the resistor R2. The source electrode of the switching element 132b is connected with the resistor R3. The drain electrodes of the switching elements 132a and 132b are connected with the FB terminal of the backlight control circuit 13.

Figure 22:
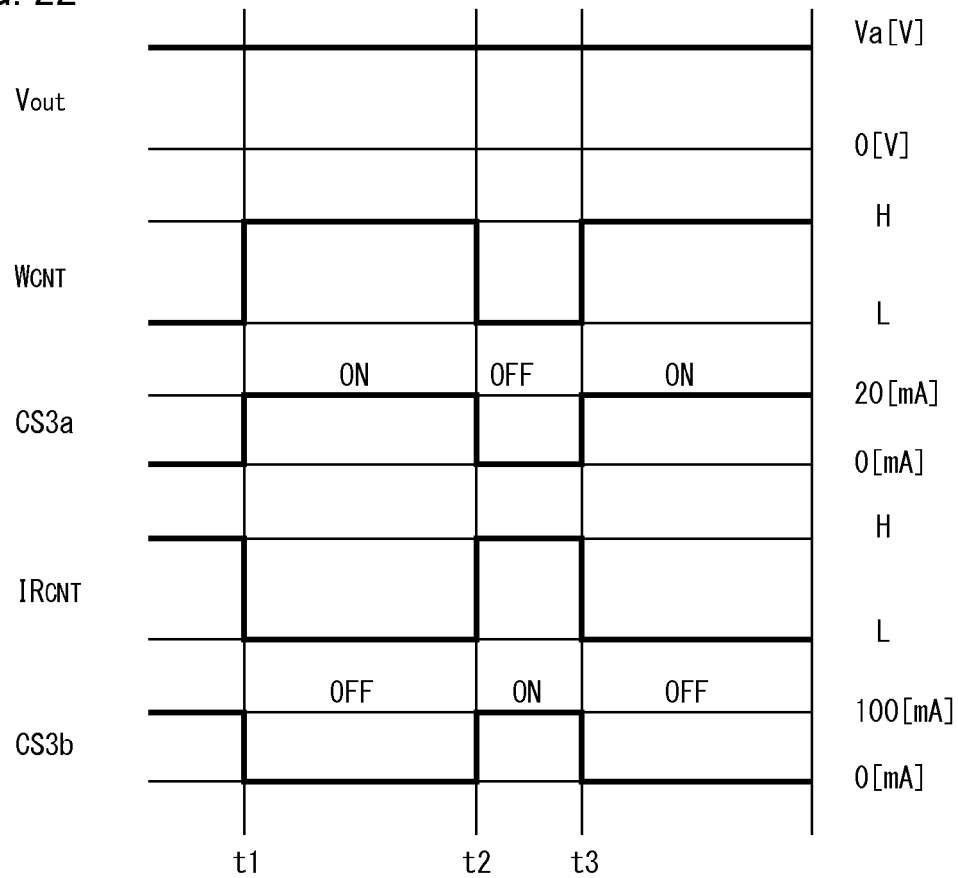
FIG. 22 is a timing chart illustrating the operations of the backlight control circuit.

FIG. 22 is a timing chart illustrating the operations of the backlight control circuit 13. As shown in FIG. 22, a constant voltage Va [V] is constantly applied to the anodes of the white LED 3a and infrared LED 3b from the output terminal (V_out) of the power supply control circuit 131. From time t1 to time t2, the $W_{CNT}$ signal is high and thus the switching element 132a is on such that the value of the drive current CS3a supplied to the white LED 3a is at a high level (20 [mA] in this example). Thus, the white LED 3a is on. During this period, the $IR_{CNT}$ signal is low and thus the switching element 132 b is off such that the value of the drive current CS3b supplied to the infrared LED 3b is at a low level (0 [mA] in this example). Thus, the infrared LED 3b is off.

On the contrary, at time t2, the $IR_{CNT}$ signal switches from low to high level while the $W_{CNT}$ signal switches from high to low level. Thus, the value of the drive current CS3a supplied to the switch white LED 3a is at a low level (0 [mA] in this example) while the value of the drive current CS3b supplied to the infrared LED 3b is at a high level (100 [mA] in this example). Thus, from time t2 to time t3, the white LED 3a is off and the infrared LED 3b is on. The period from time t2 to time t3 corresponds to period A1, from time ta to time tb, shown in FIG. 3.

At time t3, the $IR_{CNT}$ signal switches from high to low level while the $W_{CNT}$ signal switches from low to high level. Thus, the value of the drive current CS3a supplied to the switch white LED 3a is at a high level, while the value of the drive current CS3b supplied to the infrared LED 3b is at a low level. Thus, from time t3 onward, the white LED 3a is on while the infrared LED 3b is off.

Figure 23A:
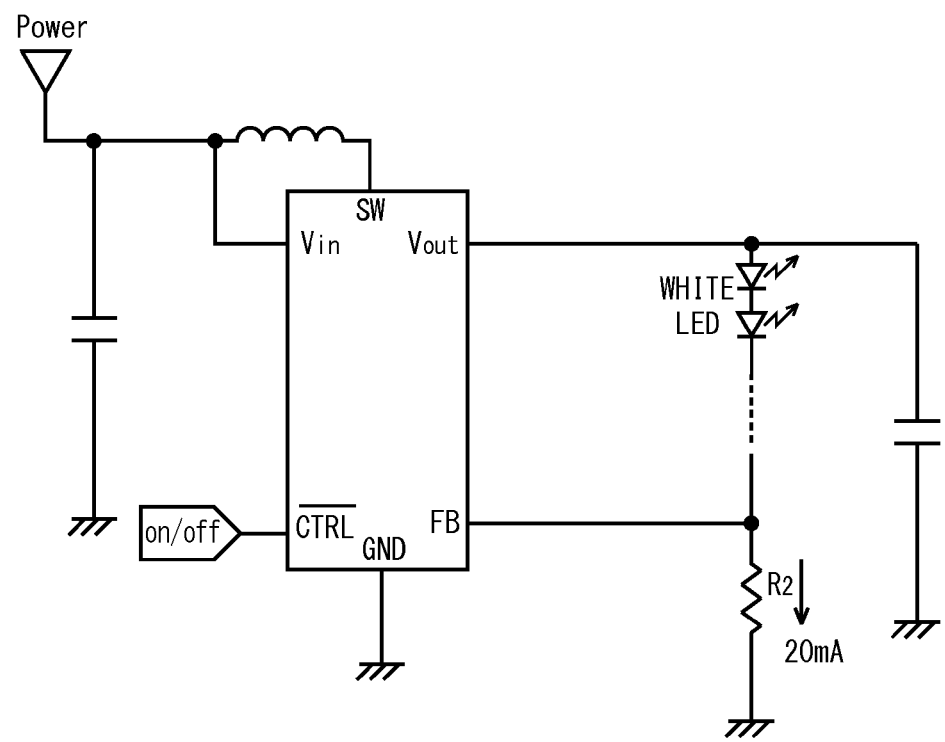
FIG. 23A is a circuit diagram of an example of a lighting control circuit for temporarily having the infrared LEDs on while constantly keeping the white LEDs on, as a comparative example in contrast to the backlight control circuit according to the present embodiment shown in FIG. 21.
Figure 23B:
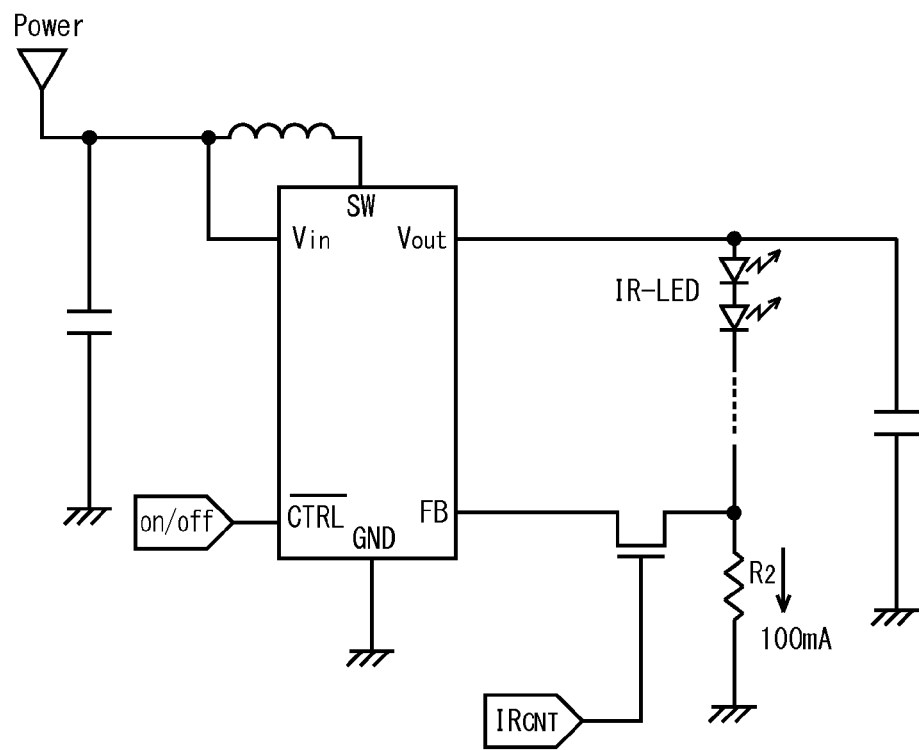
FIG. 23B is a circuit diagram of another example of a lighting control circuit for temporarily having the infrared LEDs on while constantly keeping the white LEDs on, as a comparative example in contrast to the backlight control circuit according to the present embodiment shown in FIG. 21.

Thus, the backlight control circuit 13 of the present embodiment is capable of turning on and off both the white LED 3a and infrared LED 3b using a single power supply control circuit 131. As such, the circuit configuration is simpler than with separate lighting control circuits for the white LED 3a and infrared LED 3b, as shown in FIGS. 23A and 23B, for example, as a comparative example. The circuits shown in FIGS. 23A and 23B are lighting control circuits for constantly keeping the white LED 3a on and temporarily having the infrared LED 3b on, as shown in FIG. 20 as a comparative example.

Further, as discussed above, in the backlight control circuit 13 of the present embodiment, the value of the drive current CS3b supplied to the white LED 3b is smaller or zero when the infrared LED 3b is on in period A1. This may reduce a momentary voltage drop that may occur when the infrared LEDs 3b are turned on, thereby preventing improper display and malfunctions of the touch panel.

[Second Embodiment]

Figure 24:
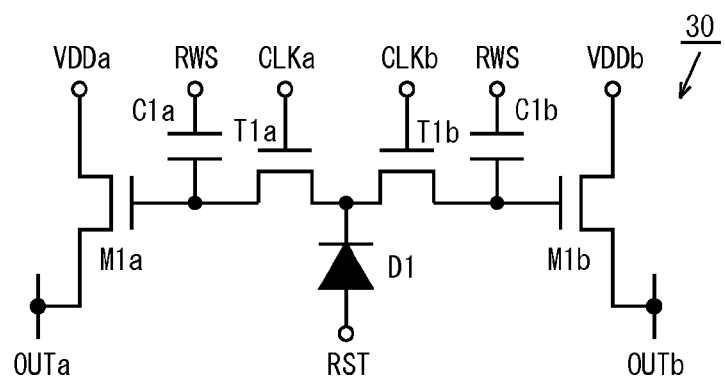
FIG. 24 is a circuit diagram of a sensor pixel circuit according to a second embodiment of the present invention.

FIG. 24 is a circuit diagram of a pixel circuit according to a second embodiment of the present invention. The pixel circuit 30 shown in FIG. 24 includes transistors T1a, T1b, M1a and M1b, a photodiode D1, and capacitors C1a and C1b. The transistors T1a, T1b, M1a and M1b are n-type TFTs. In FIG. 24, the left half corresponds to the first pixel circuit while the right half corresponds to the second pixel circuit. The pixel circuit 30 is connected with clock lines CLKa and CLKb, a reset line RST, readout lines RWS, power supply lines VDDa and VDDb and output lines OUTa and OUTb.

Figure 25:
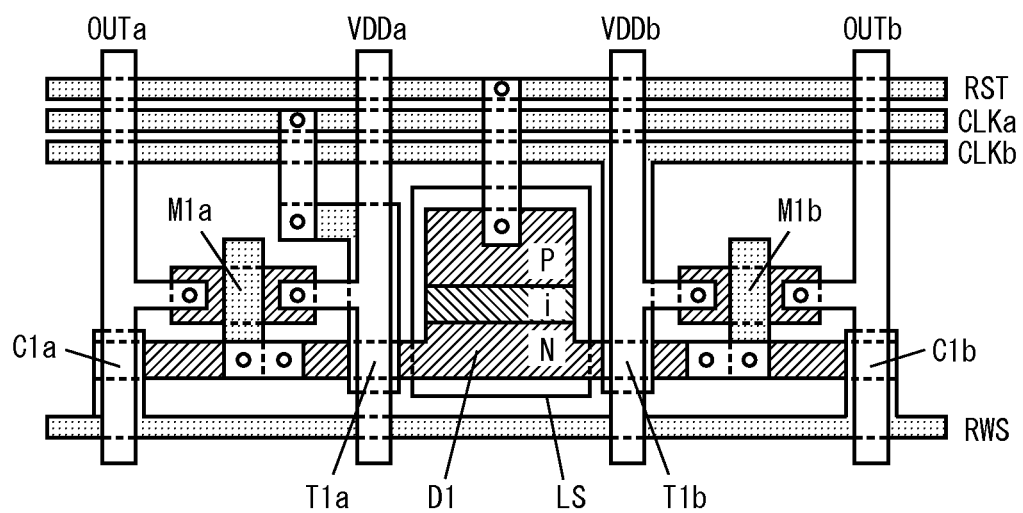
FIG. 25 is a layout of the sensor pixel circuit of FIG. 24.

As shown in FIG. 24, the photodiode D1 has an anode connected with the reset line RST and a cathode connected with the sources of the transistors T1a and T1b. The transistor T1a has a gate connected with the clock line CLKa and a drain connected with the gate of the transistor M1a. The transistor M1a has a drain connected with the power supply line VDDa and a source connected with the output line OUTa. The capacitor C1a is provided between the gate of the transistor M1a and one of the readout lines RWS. The transistor T1b has a gate connected with the clock line CLKb and a drain connected with the gate of the transistor M1b. The transistor M1b has a drain connected with the power supply line VDDb and a source connected with the output line OUTb. The capacitor C1b is provided between the gate of the transistor M1b and one of the readout lines RWS. In the pixel circuit 30, the node connected with the gate of the transistor M1a serves as a first accumulation node; the node connected with the gate of the transistor M1b serves as a second accumulation node; and the transistors M1a and M1b serve as readout transistors. FIG. 25 is a layout of the pixel circuit 30. FIG. 25 may be explained similarly to the layout of the first embodiment.

Figure 26:
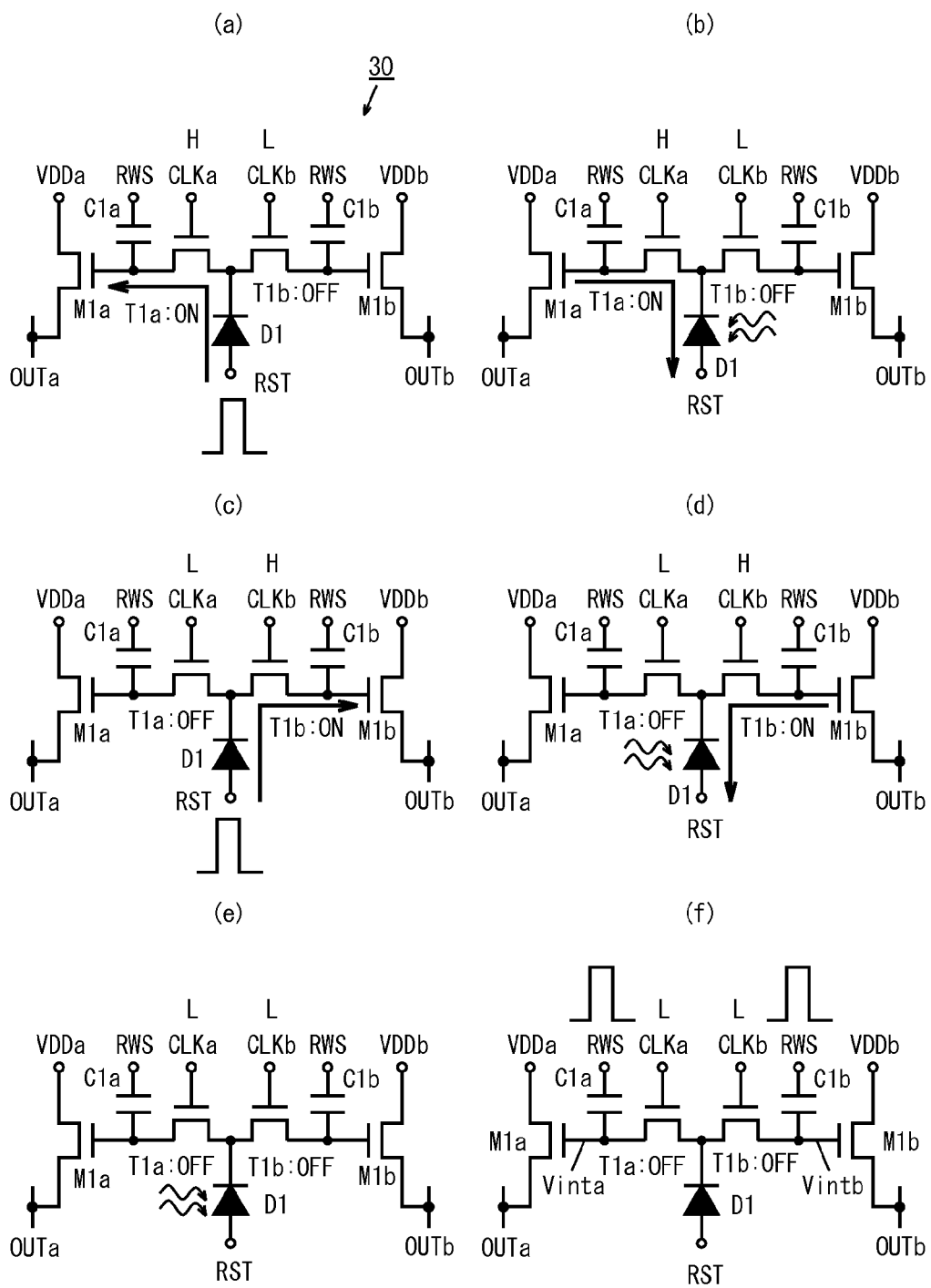
FIG. 26 illustrates the operations of the sensor pixel circuit of FIG. 24.

FIG. 26 illustrates the operations of the pixel circuit 30. The pixel circuit 30 performs (a) the reset occurring when the infrared LEDs 3b are on, (b) the accumulation occurring when the infrared LEDs 3b are on, (c) the reset occurring when the infrared LEDs 3b are off, (d) the accumulation occurring when the infrared LEDs 3b are off, (e) retention and (f) readout in one frame.

Figure 27:
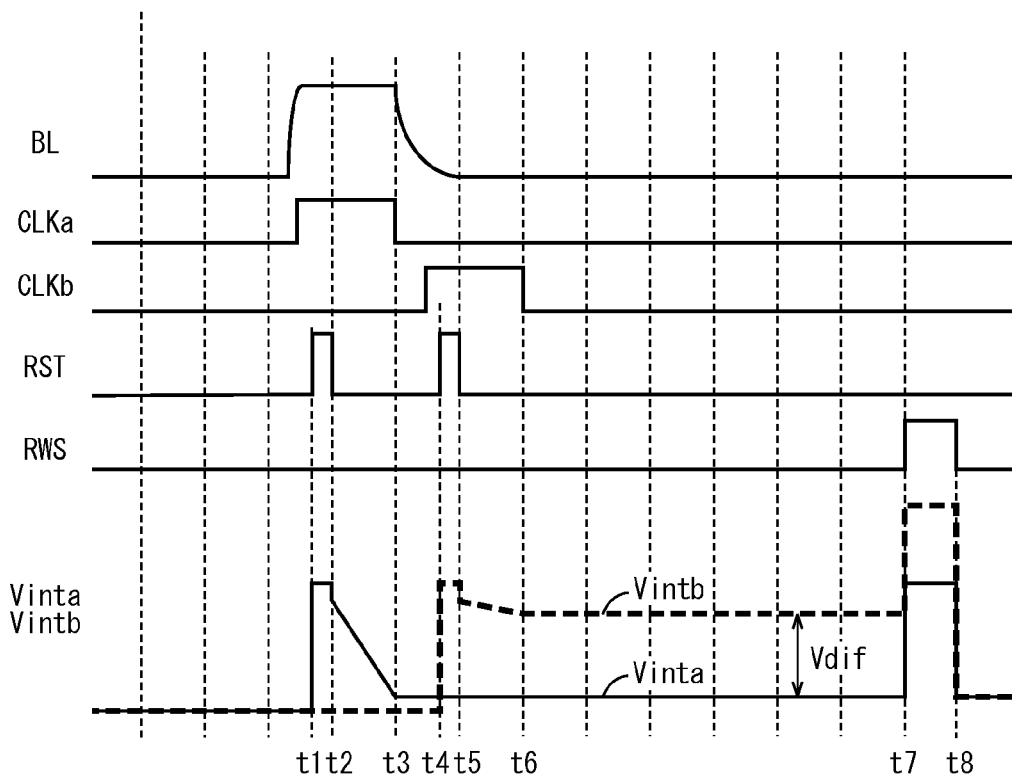
FIG. 27 is a signal waveform diagram for the sensor pixel circuit of FIG. 24.

FIG. 27 is a signal waveform diagram of the pixel circuit 30. In FIG. 27, Vinta represents the potential on the first accumulation node (the potential on the gate of the transistor M1a), while Vintb represents the potential on the second accumulation node (the potential on the gate of the transistor M1b). In FIG. 27, times t1 and t2 define the reset period occurring when the infrared LEDs 3b are on, times t2 and t3 the accumulation period occurring when the infrared LEDs 3b are on, times t4 and t5 the reset period occurring when the infrared LEDs 3b are off, times t5 and t6 the accumulation period occurring when the infrared LEDs 3b are off, times t3 and t4 as well as times t6 and t7 the retention period, and times t7 and t8 the readout period.

During the reset period occurring when the infrared LEDs 3b are on, the clock signal CLKa is high, the clock signal CLKb and readout signal RWS are low, and the reset signal RST is high for reset. During this period, the transistor T1a is on and the transistor T1b is off. Consequently, a current (forward with respect to the photodiode D1) flows from the reset line RST through the photodiode D1 and transistor T1a to the first accumulation node (FIG. 26(a)), resetting the potential Vinta to a predetermined level.

During the accumulation period occurring when the infrared LEDs 3b are on, the clock signal CLKa is high, the clock signal CLKb, reset signal RST and readout signal RWS are low. During this period, the transistor T1a is off and the transistor T1a is off. If light impinges on the photodiode D1 during this period, a current (photocurrent of the photodiode D1) flows from the first accumulation node through the transistor T1a and photodiode D1 to the reset line RST, drawing charge from the first accumulation node (FIG. 26(b)). Thus, the potential Vinta decreases according to the amount of light impinging on the photodiode during this period (i.e. while the infrared LEDs 3b are on). During this period, the potential Vintb remains unchanged.

During the reset period occurring when the infrared LEDs 3b are off, the clock signal CLKb is high, the clock signal CLKa and readout signal RWS are low, and the reset signal RST is high for reset. During this period, the transistor T1a is off and the transistor T1b is on. Consequently, a current (forward with respect to the photodiode D1) flows from the reset line RST through the photodiode D1 and transistor T1b to the second accumulation node (FIG. 26(c)), resetting the potential Vintb to a predetermined level.

During the accumulation period occurring when the infrared LEDs 3b are off, the clock signal CLKb is high, the clock signal CLKa, reset signal RST and readout signal RWS are low. During this period, the transistor T1a is off and the transistor T1a is on. If light impinges on the photodiode D1 during this period, a current (photocurrent of the photodiode D1) flows from the second accumulation node through the transistor T1b and photodiode D1 to the reset line RST, drawing charge from the second accumulation node (FIG. 26(d)). Thus, the potential Vintb decreases according to the amount of light impinging on the photodiode during this period (i.e. while the infrared LEDs 3b are off). During this period, the potential Vinta remains unchanged.

During the retention period, the clock signals CLKa and CLKb, reset signal RST and readout signal RWS are low. During this period, the transistors T1a and T1b are off. If light impinges on the photodiode D1a during this period, the potentials Vinta and Vintb remain unchanged since the transistors T1a and T1b are off such that the photodiode D1a is electrically disconnected from the gates of the transistors M1a and M1b (FIG. 26(e)).

During the readout period, the clock signals CLKa and CLKb and reset signal RST are low, and the readout signal RWS is high for readout. During this period, the transistors T1a and T1b are off. During this period, each of the potentials Vinta and Vintb increases by the amount of increase in the potential of the readout signal RWS, and the amount of current Ia corresponding to the potential Vinta flows between the drain and source of the transistor M1a, while the amount of current Ib corresponding to the potential Vintb flows between the drain and source of the transistor M1b (FIG. 26(f)). The current Ia flows on the output line OUTa before being fed into the source driver circuit 6, while the current Ib flows on the output line OUTb before being fed into the source driver circuit 6.

In this way, in the pixel circuit 30 of the present embodiment, a single photodiode D1 (photosensor) is shared by the first and second pixel circuits 10a and 10b of the first embodiment. The cathode of the shared photodiode D1 is connected to the source of the transistor T1a included in the section corresponding to the first pixel circuit and the source of the transistor T1b included in the section corresponding to the second pixel circuit.

Similar to the first and second pixel circuits 10a and 10b of the first embodiment, the pixel circuit 30 is capable of determining the amount of light present when the infrared LEDs 3b are on and the amount of light present when the infrared LEDs 3b are off. This will provide the same advantages as in the first embodiment. Further, since a single photodiode D1 is shared by two pixel circuits, the effects of fluctuations in sensitivity behavior of the photodiode may be cancelled, making it possible to accurately determine the difference between the amount of light present when the infrared LEDs 3b are on and the amount of light present when the infrared LEDs 3b are off. Moreover, the number of photodiodes may be reduced and the aperture ratio may be increased, increasing the sensitivity of the sensor pixel circuit.

In the present embodiment, too, the value of the drive current CS3b supplied to the white LEDs 3b may be smaller or zero when the backlight control circuit 13 has the infrared LEDs 3b on during period A1. This may reduce a momentary voltage drop that may occur when the infrared LEDs 3b are on, thereby preventing improper display and malfunctions of the touch panel.

[Third Embodiment]

A third embodiment of the present invention will be described below.

The display device according to the present embodiment is different from the first embodiment in the configuration of the first sensor pixel circuit 9a and second sensor pixel circuit 9b.

FIGS. 28A to 28E show exemplary circuit configurations that may be used as the first sensor pixel circuit 9a and second sensor pixel circuit 9b of the present embodiment. The first pixel circuits 11a to 17a shown in FIGS. 28A to 28E may be obtained by modifying the first pixel circuit 10a of the first embodiment in a manner described below. The second pixel circuits 11b to 17b may be obtained by modifying the second pixel circuit 10b of the first embodiment in a similar manner.

Figure 28A:
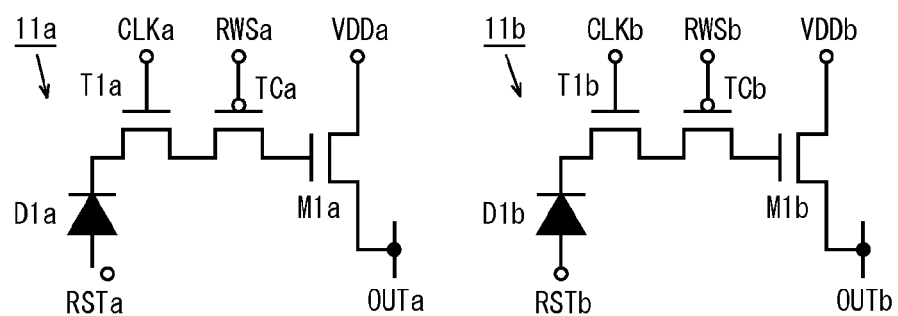
FIG. 28A is a circuit diagram of the sensor pixel circuits according to a first variation of the first embodiment.
Figure 33A:
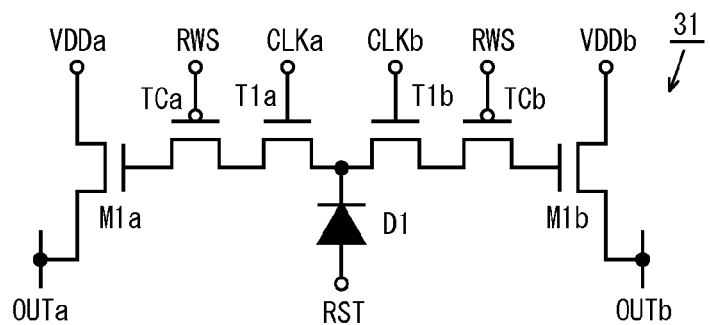
FIG. 33A is a circuit diagram of a sensor pixel circuit according to a first variation of the second embodiment.

In the first pixel circuit 11a shown in FIG. 28A, a transistor TCa, which is a p-type TFT, replaces the capacitor C1a included in the first pixel circuit 10a. In the first pixel circuit 11a, the transistor TCa has a drain connected with the drain of the transistor T1a, a source connected with the gate of the transistor M1a, and a gate connected with the readout line RWSa. The transistor TCa connected in this manner changes the potential on the accumulation node more significantly than in the original pixel circuit when a high-level signal for readout is applied to the readout line RWSa. As such, the difference between the potential on the accumulation node occurring when strong light impinges on the circuit and the potential on the accumulation node occurring when weak light impinges on the circuit may be increased, thereby improving the sensitivity of the pixel circuit 11a. Modifying the circuit illustrated in the second embodiment in a similar manner will provide a pixel circuit 31 as shown in FIG. 33A.

Figure 28B:
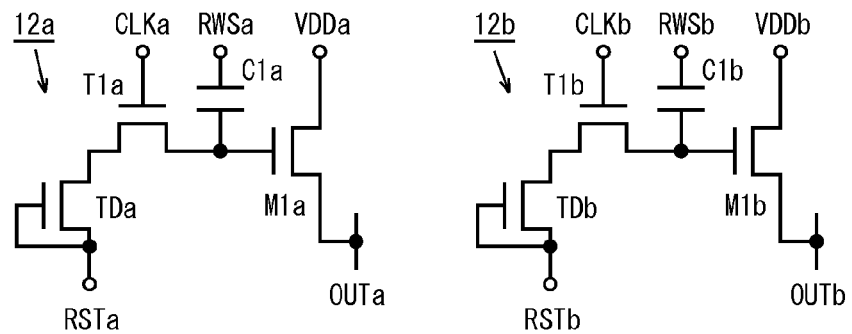
FIG. 28B is a circuit diagram of the sensor pixel circuits according to a second variation of the first embodiment.
Figure 33B:
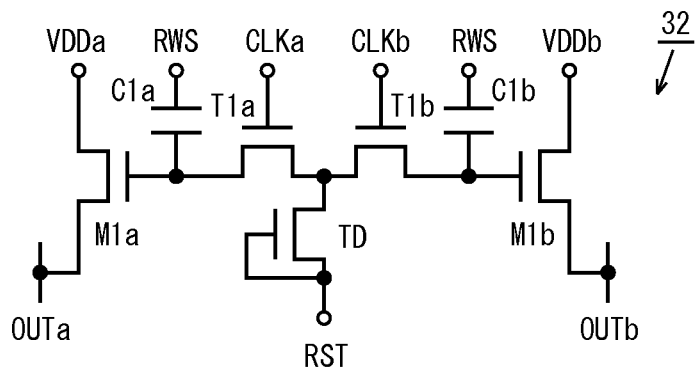
FIG. 33B is a circuit diagram of a sensor pixel circuit according to a second variation of the second embodiment.

In the first pixel circuit 12a shown in FIG. 28B, a phototransistor TDa replaces the photodiode D1 included in the first pixel circuit 10a. Thus, all the transistors included in the first pixel circuit 12a are n-type. As such, a single-channel process which is only able to manufacture n-type transistors may be used to fabricate the first pixel circuit 12a. Modifying the second embodiment in a similar manner will provide a pixel circuit 32 as shown in FIG. 33B.

Figure 28C:
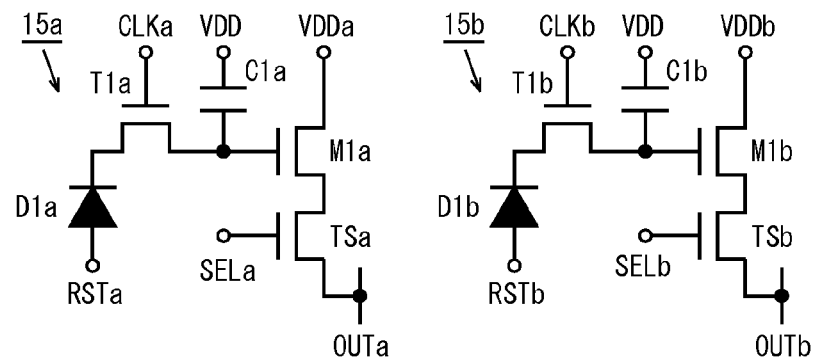
FIG. 28C is a circuit diagram of the sensor pixel circuits according to a third variation of the first embodiment.
Figure 33C:
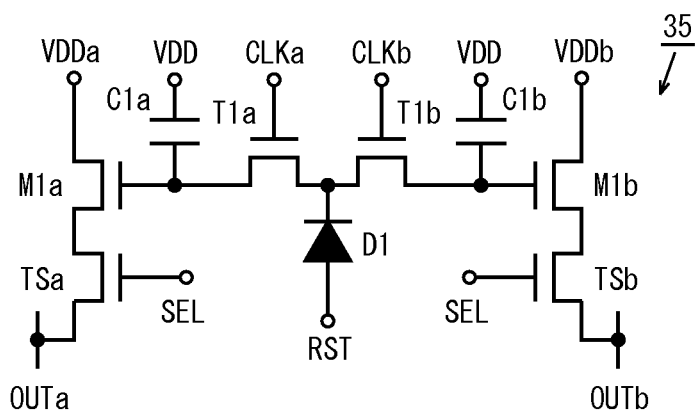
FIG. 33C is a circuit diagram of a sensor pixel circuit according to a third variation of the second embodiment.

In the first pixel circuit 15a shown in FIG. 28C, a transistor TSa is added to the first pixel circuit 10a. The transistor TSa is an n-type TFT and functions as a selective switching element. In the first pixel circuit 15a, the source of the transistor M1a is connected with the drain of the transistor TSa. The transistor TSa has a source connected with the output line OUTa and a gate connected with the select line SELa. The select signal SELa is high when the first pixel circuit 15a is being read. This provides a variation of the pixel circuit. Modifying the second embodiment in a similar manner will provide a pixel circuit 35 as shown in FIG. 33C.

Figure 29:
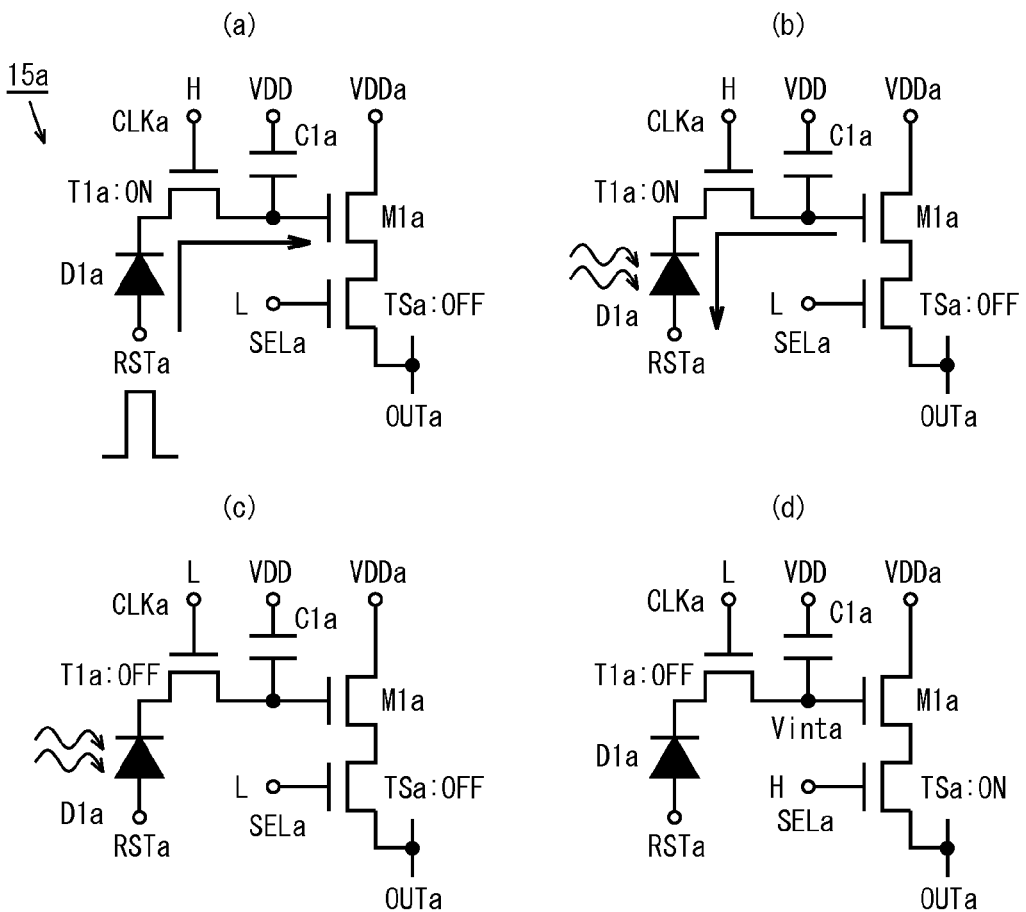
FIG. 29 illustrates the operations of one of the sensor pixel circuits of FIG. 28C.
Figure 30:
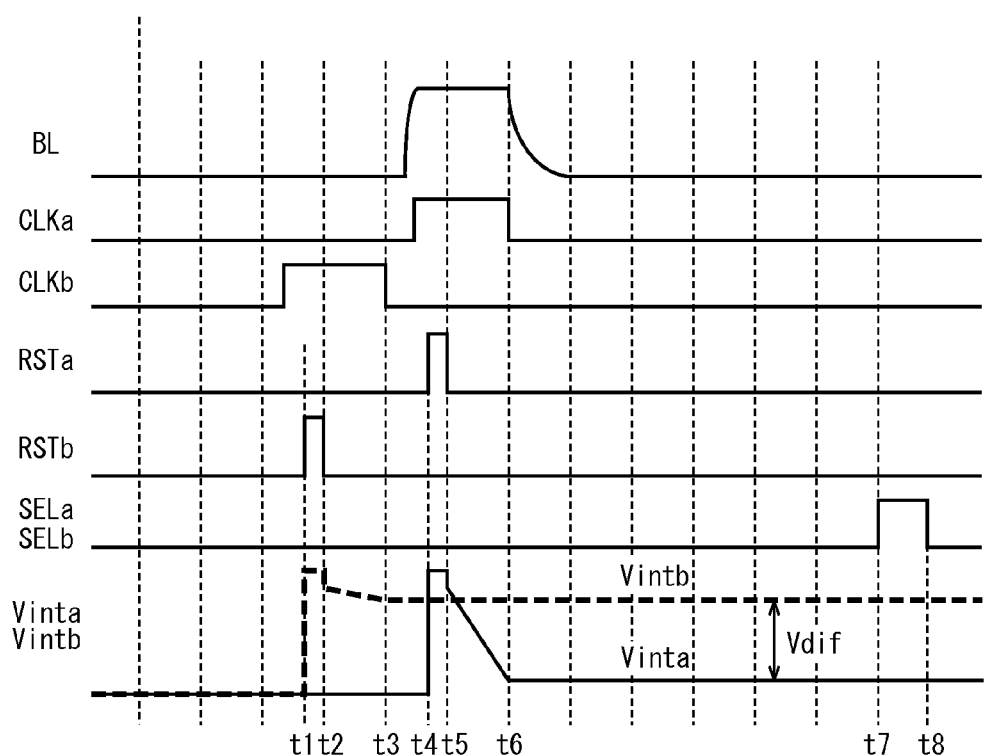
FIG. 30 is a signal waveform diagram for one of the sensor pixel circuits of FIG. 28C.

FIG. 29 illustrates the operations of the first pixel circuit 15a in sensor drive mode. FIG. 30 is a signal waveform diagram of the first pixel circuit 15a. Except during readout, the select signal SELa is low and the transistor TSa is off such that the first pixel circuit 15a operates similarly to the first pixel circuit 10a (FIG. 29(a) to (c)). During readout, the select signal SELa is high and the transistor TSa is on. During this period, the amount of current Ia corresponding to the potential Vinta flows between the drain and source of the transistor M1a (FIG. 29(d)).

Figure 28D:
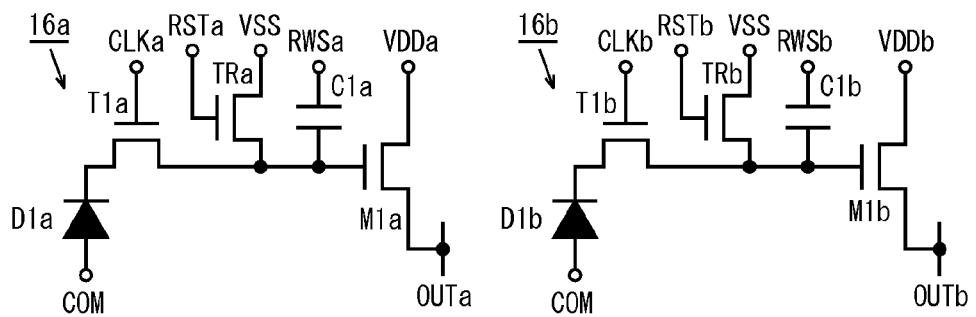
FIG. 28D is a circuit diagram of the sensor pixel circuits according to a fourth variation of the first embodiment.
Figure 33D:
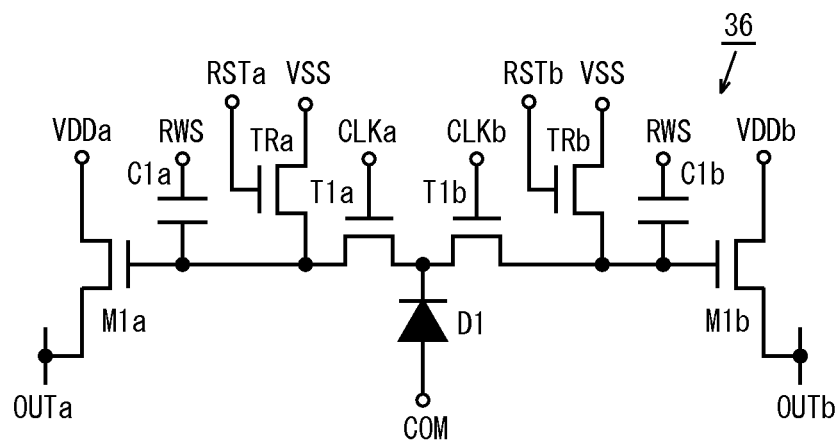
FIG. 33D is a circuit diagram of a sensor pixel circuit according to a fourth variation of the second embodiment.

In the first pixel circuit 16a shown in FIG. 28D, a transistor TRa is added to the first pixel current 10a. The transistor TRa is an n-type TFT and functions as a reset switching element. In the first pixel circuit 16a, the transistor TRa has a source to which a low-level potential VSS is applied, a drain connected with the gate of the transistor M1a and a gate connected with the reset line RSTa. A low-level potential COM is applied to the anode of the photodiode D1a. This provides a variation of the pixel circuit. Modifying the second embodiment in a similar manner will provide a pixel circuit 36 as shown in FIG. 33D.

Figure 31:
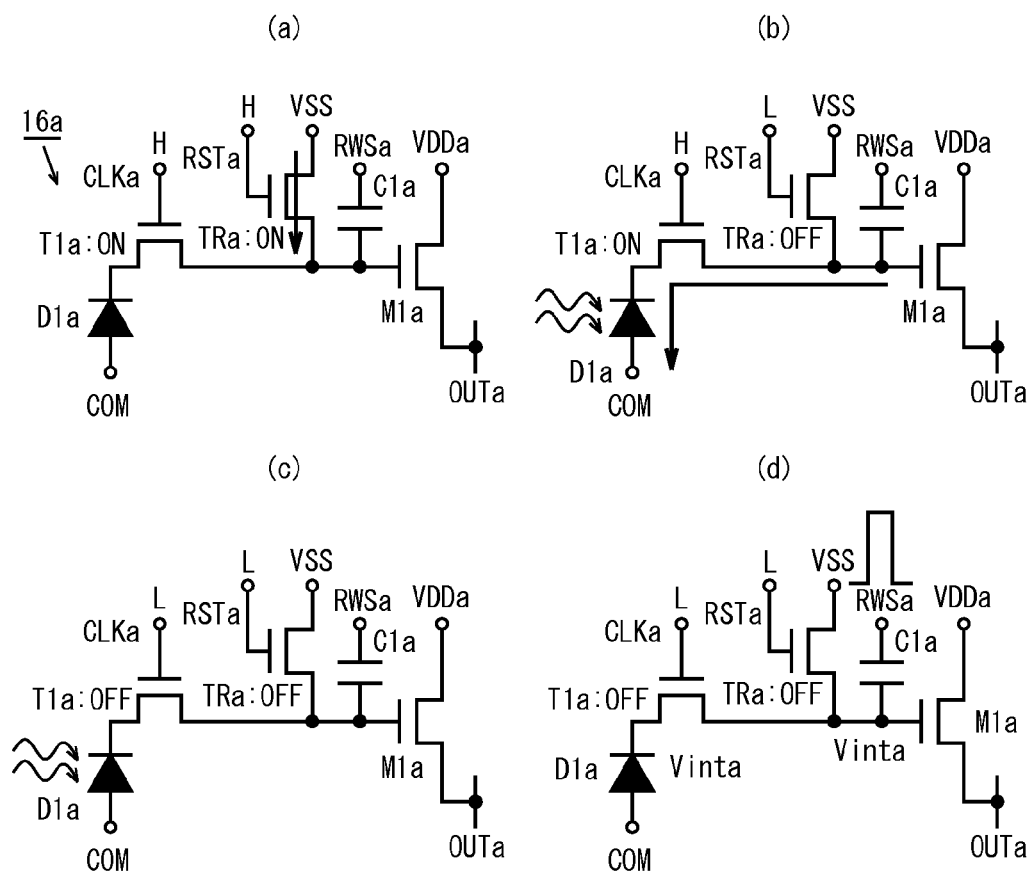
FIG. 31 illustrates the operations of one of the sensor pixel circuits of FIG. 28D.

FIG. 31 illustrates the operations of the first pixel circuit 16a in sensor drive mode. During reset, the reset signal RSTa is high and the transistor TRa is on such that the potential on the accumulation node (potential on the gate of the transistor M1a) is reset to a low-level potential VSS (FIG. 31(a)). Except during reset, the reset signal RSTa is low and the transistor TRb is off (FIG. 31(b) to (d)).

Figure 28E:
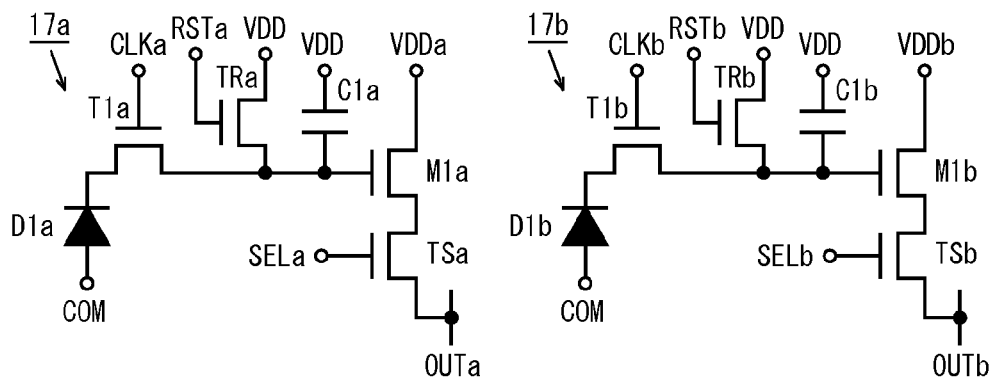
FIG. 28E is a circuit diagram of the sensor pixel circuits according to a fifth variation of the first embodiment.
Figure 33E:
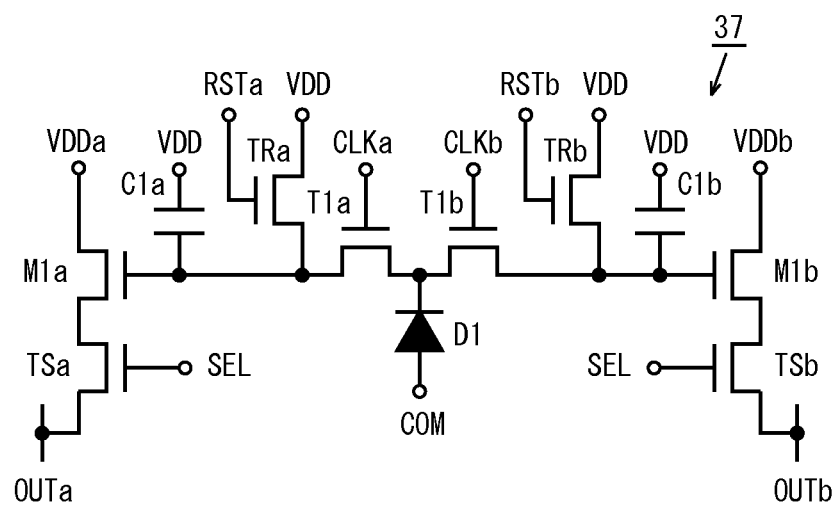
FIG. 33E is a circuit diagram of a sensor pixel circuit according to a fifth variation of the second embodiment.

In the first pixel circuit 17a shown in FIG. 28E, transistors TSa and TRa as described above are added to the first pixel circuit 10a. The transistors TSa and TRa are connected similarly to those in the first pixel circuits 15a and 16a. This provides a variation of the pixel circuit. Modifying the second embodiment in a similar manner will provide a pixel circuit 37 as shown in FIG. 33E.

Figure 32:
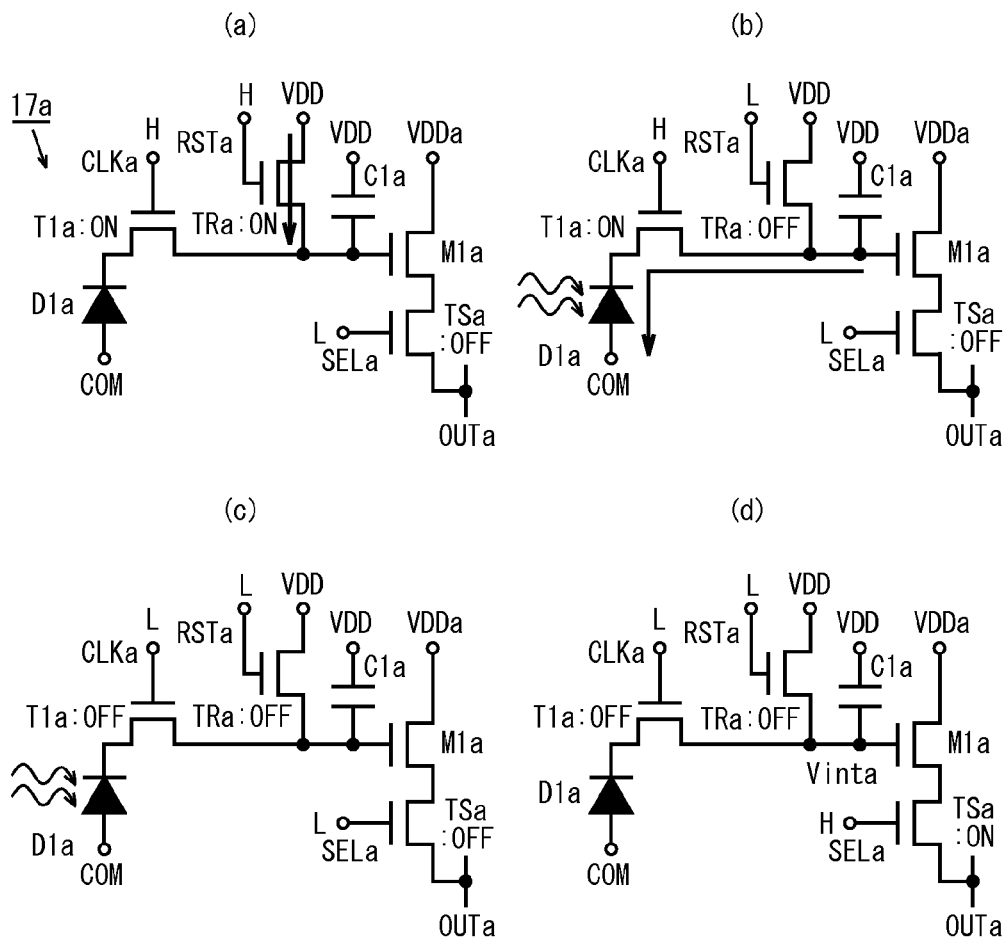
FIG. 32 illustrates the operations of one of the sensor pixel circuits of FIG. 28E.

FIG. 32 illustrates the operations of the first pixel circuit 17a in sensor drive mode. During reset, the reset signal RSTa is high and the transistor TRa is on such that the potential on the accumulation node (potential on the gate of the transistor M1a) is reset to a high-level potential VDD (FIG. 32(a)). During readout, the select signal SELa is high and the transistor TSa is on. During this period, the amount of current Ia corresponding to the potential Vinta flows between the drain and source of the transistor M1a (FIG. 32(d)). Except during reset and readout, both the reset signal RSTa and select signal SELa are low (FIGS. 32(b) and (c)).

In this way, the display device according to the present embodiment may include a first sensor pixel circuit that detects light during a detection period in which the infrared LEDs 3b are on and memorizes the amount of detected light in other periods, and a second sensor pixel circuit that detects light during a detection period in which the infrared LEDs 3b are off and memorizes the amount of detected light in other periods, where the difference between the two amounts of light is determined by an element located outside the sensor pixel circuit to determine the difference between the amount of light present when the infrared LEDs 3b are on and the amount of light present when the backlight is off. This will provide input capabilities regardless of the light environment.

In the present embodiment, too, the backlight control circuit 13 causes the value of the drive current CS3b supplied to the white LED 3b to be smaller or zero when the infrared LED 3b is on in period A1. This may reduce a momentary voltage drop that may occur when the infrared LEDs 3b are turned on, thereby preventing improper display and malfunctions of the touch panel.

[Other Embodiments]

While several embodiments of the present invention have been illustrated, the present invention is not limited to the embodiments described above, and various modifications are possible within the scope of the invention.

For example, in the above embodiments, a sensor pixel circuit is divided into a first sensor pixel circuit 9a and a second sensor pixel circuit 9b, where the first sensor pixel circuit 9a detects light during period A1 shown in FIG. 3 and the second sensor pixel circuit 9b detects light during period B1 to determine the difference between the amounts of light detected. However, the present invention may be carried out without dividing a sensor pixel circuit in this manner to determine the difference. Specifically, all the sensor pixel circuits in the pixel region 4 may detect light in period A1 shown in FIG. 3 and the amount of light detected may be used as a sensor output as it is, without determining the difference between this value and any results from other sensor pixel circuits.

INDUSTRIAL APPLICABILITY

The present invention may be industrially useful as a display device including light sensitivity using non-visible light.

The invention claimed is:

1. A display device comprising:
   an active matrix substrate;
   photosensors provided in a pixel region of the active matrix substrate;
   a visible light source configured to cause an image to be displayed in the pixel region;
   a non-visible light source configured to emit light to be reflected and sensed by the photosensors; and
   a light source control circuit configured to control on and off of the visible light source and the non-visible light source,
   wherein the light source control circuit reduces an amount of drive current supplied to the visible light source while the non-visible light source is on to below an amount of drive current supplied to the visible light source when the non-visible light source is off.

2. The display device according to claim 1, wherein a sum of an amount of power for the non-visible light source and an amount of power for the visible light source supplied when the non-visible light source is on is equal to a sum of an amount of power for the non-visible light source and an amount of power for the visible light source supplied when the non-visible light source is off.

3. The display device according to claim 1, wherein a period during which the amount of drive current supplied to the visible light source is reduced is longer than a period during which the non-visible light source is on.

4. The display device according to claim 1, wherein the light source control circuit initiates the period during which the amount of drive current supplied to the visible light source is reduced before the non-visible light source is turned on.

5. The display device according to claim 1, wherein the light source control circuit includes:
   a power supply control circuit connected to a first terminal of the visible light source and a first terminal of the non-visible light source for supplying a constant voltage to the visible light source and the non-visible light source;
   a first switching element connected between a second terminal of the visible light source and a resistor; and
   a second switching element connected between a second terminal of the non-visible light source and a resistor.

6. The display device according to claim 1, wherein the visible light source is a white LED.

7. The display device according to claim 1, wherein the non-visible light source is an infrared LED.

8. The display device according to claim 1, further comprising:
   a sensor drive circuit configured to supply a sensor drive signal to the photosensors;
   an amplifier circuit configured to amplify a signal read from the photosensors in response to the sensor drive signal to output a photosensor signal; and
   a signal processing circuit configured to process the photosensor signal output from the amplifier circuit,
   each of the photosensors including:
   a first sensor pixel circuit configured to, in response to the sensor drive signal, accumulate a charge corresponding to an amount of light received during an accumulation period in which the non-visible light source is on, and output, during a readout period, a sensor signal corresponding to the charge that has been accumulated; and
   a second sensor pixel circuit configured to, in response to the sensor drive signal, accumulate a charge corresponding to an amount of light received during an accumulation period in which the non-visible light source is off, and output, during a readout period, a sensor signal corresponding to the charge that has been accumulated,
   wherein the signal processing circuit calculates a difference between the sensor signal output from the first sensor pixel circuit and the sensor signal output from the second sensor pixel circuit.

9. The display device according to claim 8, wherein each of the first and second sensor pixel circuits includes:
   one light receiving element;
   one accumulation node capable of accumulating a charge corresponding to an amount of light sensed;
   a readout transistor having a control terminal electrically connectable with the accumulation node; and
   a retaining switching element provided on a path of current passing through the light receiving element, the retaining switching element being configured to be turned on or off in response to the control signal.

10. The display device according to claim 9, wherein in each of the first and second sensor pixel circuits,
    the retaining switching element is provided between the accumulation node and one terminal of the light receiving element, and
    another terminal of the light receiving element is connected with a reset line.

11. The display device according to claim 8, wherein the first and second sensor pixel circuits share one light receiving element, and
    one terminal of the light receiving element is connected with one end of a retaining switching element included in each of the first and second sensor pixel circuits and another terminal is connected with a reset line.

12. The display device according to claim 1, further comprising:
    a counter substrate being opposite the active matrix substrate; and
    liquid crystal sandwiched between the active matrix substrate and the counter substrate.

* * * * *